United States Patent
Lawson et al.

(10) Patent No.: US 9,861,899 B1
(45) Date of Patent: Jan. 9, 2018

(54) SYSTEM CAPABLE OF INTEGRATING USER-ENTERED GAME EVENT DATA WITH CORRESPONDING VIDEO DATA

(71) Applicant: Sports Logic Group, LLC, Weston, FL (US)

(72) Inventors: Jeffrey Lowell Lawson, Davie, FL (US); Darrell Knudson, Irvine, CA (US)

(73) Assignee: Sports Logic Group, LLC, Weston, FL (US)

( * ) Notice: Subject to any disclaimer, the term of this patent is extended or adjusted under 35 U.S.C. 154(b) by 0 days.

(21) Appl. No.: 15/232,625

(22) Filed: Aug. 9, 2016

Related U.S. Application Data

(63) Continuation of application No. 15/076,470, filed on Mar. 21, 2016, now Pat. No. 9,454,993, which is a continuation-in-part of application No. 14/920,786, filed on Oct. 22, 2015, now Pat. No. 9,330,726.

(60) Provisional application No. 62/239,723, filed on Oct. 9, 2015.

(51) Int. Cl.
| | |
|---|---|
| *H04N 21/6587* | (2011.01) |
| *A63F 13/86* | (2014.01) |
| *A63F 13/335* | (2014.01) |
| *A63F 13/25* | (2014.01) |
| *A63F 13/2145* | (2014.01) |
| *A63F 13/213* | (2014.01) |

(52) U.S. Cl.
CPC ............ *A63F 13/86* (2014.09); *A63F 13/213* (2014.09); *A63F 13/2145* (2014.09); *A63F 13/25* (2014.09); *A63F 13/335* (2014.09); *A63F 2300/1075* (2013.01)

(58) Field of Classification Search
CPC combination set(s) only.
See application file for complete search history.

(56) References Cited

U.S. PATENT DOCUMENTS

| | | |
|---|---|---|
| 6,148,242 A | 11/2000 | Descalzi et al. |
| 6,725,107 B2 | 4/2004 | MacPherson |
| 6,984,176 B2 | 1/2006 | Bishop |

(Continued)

OTHER PUBLICATIONS

U.S. Appl. No. 14/839,722, filed Aug. 28, 2015, Lawson et al.
U.S. Appl. No. 15/069,696, filed Mar. 14, 2016, Lawson et al.

*Primary Examiner* — Kieu Oanh T Bui
(74) *Attorney, Agent, or Firm* — Knobbe, Martens, Olson & Bear LLP

(57) ABSTRACT

A mobile application is disclosed enabling a first sporting event spectator to efficiently record game actions and a second sporting event spectator to simultaneously record real-time video of the game actions. Using a mobile device having a touch screen, the first user can efficiently, and with limited user interaction, indicate fast paced game actions of players engaged in a sport. Using a separate mobile device, or a video system in communication with a network, the second user can record video of a presently occurring game in which the game actions occur. A system in communication with the first and second users' devices can receive indications of game actions, and receive video of the game, and associate each indicated game action with a portion of the video of the game action. The system may, for example, use these associations to generate an index that enables users to view descriptions of the game actions and jump to corresponding video clips.

19 Claims, 12 Drawing Sheets

(56) References Cited

U.S. PATENT DOCUMENTS

| | | |
|---|---|---|
| 7,646,914 B2 | 1/2010 | Clausi et al. |
| 7,798,905 B2 | 9/2010 | Thompson et al. |
| 8,172,702 B2 | 5/2012 | Meadows et al. |
| 8,731,458 B2 | 5/2014 | Sullivan |
| 8,775,526 B2 * | 7/2014 | Lorch ................. H04M 1/7253 455/556.1 |
| 9,129,153 B2 | 9/2015 | Ianni et al. |
| 9,186,568 B2 | 11/2015 | Ianni et al. |
| 9,186,587 B2 | 11/2015 | Jalili |
| 9,196,115 B1 | 11/2015 | Knapp et al. |
| 9,233,292 B2 | 1/2016 | Joseph et al. |
| 9,330,726 B1 | 5/2016 | Lawson et al. |
| 2002/0040253 A1 | 4/2002 | Mcnally et al. |
| 2002/0151994 A1 | 10/2002 | Sisco |
| 2005/0240294 A1 | 10/2005 | Jones et al. |
| 2006/0079332 A1 | 4/2006 | Bishop |
| 2010/0063607 A1 | 3/2010 | Neale et al. |
| 2010/0151941 A1 | 6/2010 | Gong |
| 2010/0211198 A1 | 8/2010 | Ressler |
| 2011/0093924 A1 | 4/2011 | Thompson |
| 2011/0126255 A1 | 5/2011 | Perlman et al. |
| 2012/0064956 A1 | 3/2012 | Das et al. |
| 2013/0124461 A1 | 3/2013 | Dombrowski et al. |
| 2013/0085018 A1 | 4/2013 | Jensen et al. |
| 2013/0097635 A1 * | 4/2013 | Yerli .................. H04N 21/2187 725/37 |
| 2013/0298178 A1 | 11/2013 | Perlman et al. |
| 2014/0274411 A1 | 9/2014 | Moffett |
| 2014/0288683 A1 | 9/2014 | Sullivan |
| 2015/0347827 A1 * | 12/2015 | Dickinson .......... G06K 9/00302 382/103 |

* cited by examiner

SYSTEM CAPABLE OF INTEGRATING USER-ENTERED GAME EVENT DATA WITH CORRESPONDING VIDEO DATA

CROSS-REFERENCE TO RELATED APPLICATIONS

Any and all applications for which a foreign or domestic priority claim is identified in the Application Data Sheet as filed with the present application are hereby incorporated by reference in their entirety under 37 CFR 1.57.

BACKGROUND

A variety of software platforms exist for enabling game spectators and statisticians to enter game events and to view associated game statistics. Services and software tools exists for augmenting and/or indexing videos of sports events with data regarding specific game events. This allows viewers of the video to skip to specific events, and in some cases, to view on-screen data regarding the events. The existing process, however, tends to be labor-intensive and time consuming, as it typically requires a user to view the video and to enter the relevant information during such viewing.

SUMMARY

A mobile application is disclosed that enables a first sporting event spectator, or multiple sporting event spectators, to efficiently record game actions, such as shot events, and a second sporting event spectator, or multiple sporting event spectators, to simultaneously record real-time video of the game actions. Using a mobile device having a touch screen (e.g., phone, smartphone, tablet, hybrid laptop, wearable device), the first user (e.g., a coach, a parent) can efficiently, and with limited user interaction, indicate fast paced game actions (e.g., shots on goal, blocks, passing) of players engaged in a sport (e.g., basketball, soccer, hockey, lacrosse, and so on). Using a different mobile device, or a video system (e.g., camera, video camera, video camera included on a drone flying over the game, video camera on a player) in communication with a network (e.g., the Internet, a local communication with another mobile device), the second user can record video of a presently occurring game in which the game actions occur. A system in communication with the first and second users' user devices can receive indications of game actions along with video of the game, and associate each indicated game action with a portion of the video (e.g., a video clip) displaying the game action. The system can generate, for a particular game, associations of indicated game actions with respective portions of video. The recorded video of the game can be provided (e.g., for display) along with indexes, in the video such as metadata of the video or as a separate file, of particular game actions that occurred during the game. A user of the indexed video can view the entire game, or view portions of video associated with selected game actions of interest to the user. Additionally, when viewing a recorded video of a game, or a portion of video, textual information (e.g., subtitles) can be provided that describe a presently occurring game action (e.g., particular teams involved, a player performing a game action, a type of game action, and so on).

The mobile application, and/or the system, may also provide access to information describing indicated game actions and associated recorded videos of the game actions to one or more other users (e.g., a remote spectator such as a grandparent of a child engaged in the game). For instance, a third user can view the recorded video in a substantially real-time streaming fashion, and view information describing all game actions that have, as of the viewing time, been indicated during the game. The mobile application can allow for a selection of a particular game action, and the third user can view the video clip associated with the selected game action. In this way, the third user can follow the game, and if the third user misses a particular game action, he/she can select the particular game action (e.g., a most recent game action) and view the associated video clip.

Utilizing the mobile application, users can indicate types of game actions, and/or particular players, for which they are interested in receiving updates (e.g., substantially real-time during a game). The system can generate notifications describing an indicated game action, and a link to a portion of video associated with the game action, to users that have indicated a desire to receive notifications regarding the game action. For instance, a spectator (e.g., a parent) can indicate that he/she wishes to receive all game actions (or those of a particular type) associated with a particular player (e.g., his/her daughter or son).

In general, one innovative aspect of the subject matter described in this specification can be embodied in methods that include the actions of receiving game action data specified by a first spectator of a sports event, the game action data specified by the first spectator during the sports event via a mobile application running on a first mobile device, the game action data including an identifier of a player that took a shot and an indication of an outcome of the shot; storing the game action data in association with a time reference, the time reference at least approximately indicating a point in time at which the shot was taken during the sports event; receiving, and storing, a video of the sports event, the video including time reference data; automatically selecting, based on (1) the time reference stored in association with the game action data and (2) the time reference data included in the video, a sequence of video frames of the video corresponding to the shot, the sequence representing a video clip of the shot; and generating a user interface that includes a representation of the game action data and a user-selectable control, the user-selectable control being selectable to play the video clip; the method performed programmatically by a computing system under control of program instructions, the computing system including a server that stores and provides network based access to the video clip.

The details of specific embodiments are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION OF THE PREFERRED EMBODIMENTS

Figure 1:
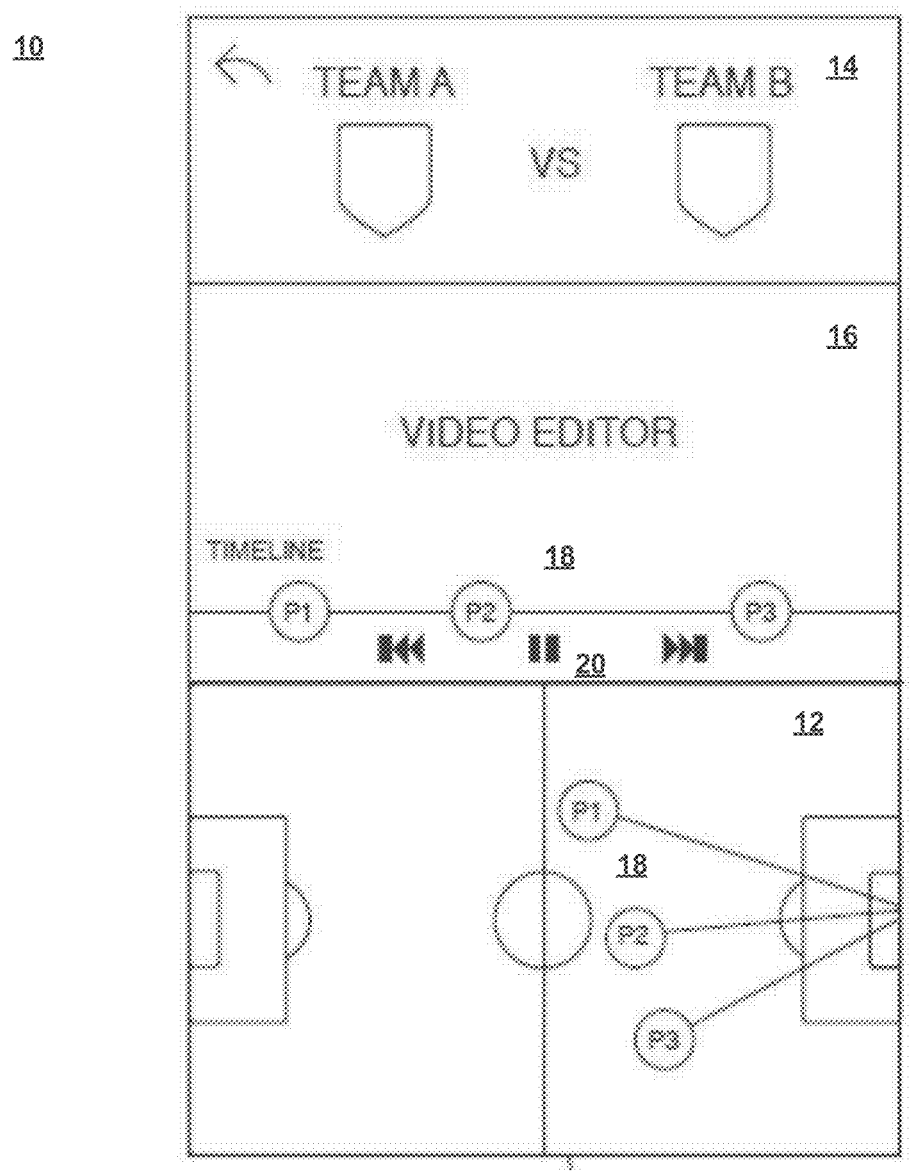
FIG. 1 illustrates an example user interface for viewing summary data associated with a game.

This specification describes a server system, in communication with (e.g., over a network such as the Internet) user devices each running a mobile application, that receives indications of game actions of players presently engaged, or previously engaged, in a sports game, and associates an indicated game action with a portion of a received video of the sports game (e.g., a video clip of the game event). As will be described, in some implementations a device (e.g., a user device, a video camera, a camera, a video camera mounted on a drone, and so on) can communicate with the server system without running the mobile application, or the device can provide images, or video, to the server system by initially providing the images, or video, to a user device (e.g., over a Wi-Fi or BLUETOOTH connection) that runs the mobile application and is in communication with the server system.

In this specification, a game action is any qualifiable action performed by a player in a sports game to further an objective, or strategy, of the sports game, and can include an outcome of the performed action. Game actions can include different types of game actions appropriate to respective sports (e.g., "Shot", "Block", "Foul Ball", "Ball Passed", and so on).

The user devices (e.g., phone, smartphone, tablet, hybrid laptop, wearable device) can execute an application (e.g., the mobile application downloaded or otherwise available from an electronic application store, or from the server system) that can receive user inputs (e.g., on a touch sensitive screen of the user device) of a user (e.g., a parent or other relative, a team manager, a team coach, and so on) viewing a presently occurring game. The server system can receive information from the user devices (e.g., from users of the user devices), and store the information to later display in the mobile applications running on the user devices. Additionally, each user can be associated with a user account of the server system, and can provide log in information associated with a user account to his/her user device, which the server system can receive and authenticate.

Indicating a Game Action

Utilizing the mobile application, a user can indicate game actions that respective players have performed in a presently occurring game (e.g., a shot, a block, a pass, and so on). For instance, the user can provide one or more user inputs (e.g., to a touch sensitive user interface generated by the mobile application) to indicate a particular player that performed a game action (e.g., the user can select a player from a visual representation of all players), and indicate a starting location of the game action (e.g., a location from which the particular player kicked a soccer ball towards a goal) along with an outcome location of the game action (e.g., a location at which the soccer ball was blocked from the goal, or a location of the goal). To facilitate the user indicating game actions, each mobile application can display a representation of a game map associated with a type of sport in which the players are engaged.

To indicate a game action, the mobile application can provide (e.g., display) types of game actions appropriate for the type of sport being played. The user can then select from among the types of game actions. In some implementations, the mobile application can utilize a context of the game action (e.g., a context for the outcome location), to identify types of game actions to present.

For instance, for the sport of soccer, the mobile application can provide a game action of a "shot" with outcome options of including "Goal", "Miss", "Blocked", and so. Other soccer game actions, such as "Pass" and "Kick", may also be implemented. For the type of game action "Pass", the mobile application can further receive a selection of a player that was passed to. In some implementations, the user can indicate a leg that a soccer ball was kicked with. For instance, the user can select "Kick", and the mobile application can present selectable options for "Left Foot" and "Right Foot". The user can select one of the two selectable options, which can include sliding his/her finger to the left or right on the touch screen display. Additionally, the input can include tapping a particular number of times for "Left Foot" (e.g., one tap), or tapping a particular number of times for "Right Foot" (e.g., two taps). Furthermore, the game monitoring system 100 can store, or determine based on historical selections of left or right foot, indications of a foot each player normally (e.g., a measure of central tendency) uses. Upon selection of "Shot", the mobile application can utilize the normal kicking foot, but provide an option, or provide a user input pattern, to change the game action to the other kicking foot.

In another instance, the sport of baseball can include "Ball", "Strike", "Foul Ball", "Homerun", "Base stolen", "Base Reached", and so on. In another instance, the sport of Basketball can include "Shot", "Two Point Shot", "Three Point Shot", "Block", "Dunk", and so on. In another instance, the sport of football can include "Pass", "Lateral", "Tackle", "Rush", "Field Kick", "Punt", and so on.

In some implementations, the server system can enforce permissions of the user (e.g., Access Control List privileges). That is, each user can have associated privileges, or permissions, allowing the user to indicate game actions solely for particular players (e.g., the user's daughter/son, brother, guardian, friend), or for all players on one or more teams (e.g., the user can be a coach, team manager, or a parent of a player).

After receiving indications of one or more game actions and associated players, a mobile application can store (e.g., in local memory of a user device executing the mobile application) information describing the game actions and associated players. For instance, the mobile application can store an indication of a particular player, locations associated with the game action, and a type of game action. The mobile application can then provide the stored information to the server system for storage. In some implementations, the mobile application can provide stored game action data periodically (e.g., every minute, every 10 minutes), and/or the mobile application can provide stored game action data upon a number of stored game actions exceeding a threshold (e.g., 3, 4, 10).

Each received indication of a game action can be associated with a time reference (e.g., a time stamp), which can be based on a time, as determined by the user device, that the user device provided the indication, or based on a game clock displayed in the mobile application that can be initiated by a user of the user device. As will be described below, the server system can associate each game action with a portion of video. The system utilizes the associated time reference of each game action, and utilizes an assumption that an indicating user likely indicated a game action within a particular time period of its actual occurrence (e.g., 15 seconds, 20 seconds, 30 seconds). In some implementations, the mobile application can include an interface to adjust when the game action occurred. For instance, the mobile application can display a slide bar, or other user interactable (e.g., selectable) object, with a default of 15 seconds (e.g., the default can be that the game action occurred 15 seconds prior to indication by a user). The slide bar can be configurable, allowing a user to indicate that the game action occurred prior to, or subsequent to, the 15 second default.

One example of a mobile application, and user interfaces, that may be used to enter game action data is described in more detail in U.S. patent application Ser. No. 14/839,722 titled "TOUCH INTERFACE FOR EFFICIENT CAPTURE OF GAME EVENT DATA," which is hereby incorporated by reference in its entirety.

Associating a Portion of a Received Video with an Indicated Game Action

In addition to a user indicating game actions, utilizing the mobile application, or an outside system which can capture video (e.g., video camera), a different user, or in some implementations the same user indicating game actions, viewing a presently occurring game can record the game, and provide the recorded video to the server system (e.g., substantially in real-time as a stream if a network connection is available). In some implementations, a drone (e.g., an Unmanned Aerial Vehicle) can be utilized to capture video without user interaction, and can automatically provide the video to the server system, or to a user device in communication with the server system. The server system can receive the video, and upon receipt of an indication (e.g., by a different user) of a game action, the server system can associate a portion of the received video as being associated with the game action. That is, the server system can determine a clip of the video that shows the game action being performed.

The server system can determine the portion of the video to associate with the game action using a time the game action was indicated. That is, the server system can associate a particular time period prior to a time the game action was indicated as corresponding to a start of the portion, and associate a particular time period also prior, and in some implementations subsequent, to a time the game action was indicated as corresponding to an end of the portion. To associate a portion of video with a game action, the server system can correlate time information (e.g., time reference data) associated with the video (e.g., metadata identifying time stamps of frames in the video, or textual information included in each frame of the video identifying times), with a time the game action was indicated. This correlation can be performed substantially in real-time, or as will be described below, the video can be provided to the server system after the game, and the server system can still correlate portions of the video to indicated game actions.

Furthermore, the server system can enable a spectator user to follow a presently occurring, or prior, game. The server system can provide summary data describing game actions that have been indicated for a selected game (e.g., for presentation on a user device or a web page), with each game action configured to be selected by the spectator. Upon selection of a game action, the server system can provide a portion of video of the game associated with the selected game action. Additionally, the server system can provide the entire video in a streaming presentation to the spectator, allowing the spectator to view the entire game, or portions of the game. The spectator can utilize the mobile application to view video of the game, and information describing indicated game actions, or alternatively, the spectator can access an interactive document (e.g., a web page) in communication with, or hosted by, the server system and view video of the game and indications of game actions via the interactive document.

In addition, a spectator can indicate that he/she wants to receive updates regarding one or more player's (e.g., the spectator's children) game actions as the game actions occur in a presently occurring game (e.g., substantially in real-time). That is, the spectator can create filters (e.g., using the mobile application or interactive document) identifying players, and/or specific types of game actions (e.g., shots, passes) of all players or specific players, and the server system can provide notifications identifying game actions that enable the spectator to view portions of video associated with the identified game actions. For instance, a notification can be received on a spectator's mobile device (e.g., as a text message, an e-mail message, a social network notification, a push notification from the mobile application, a tweet, etc.), and the notification can indicate information describing a game action, and a link to view a portion of video associated with the game action.

In this specification, real-time, and/or substantially in real-time, means a time period that is proximate to when a game action has been indicated. Since a user can indicate a game action, and the server system not receive the game action in real-time due to a lack of network connectivity, real-time therefore is to mean a time period proximate to when the game action has been indicated, and can depend on network connectivity factors (e.g., 1 second, 5 seconds, 30 seconds, and so on). In some implementations, if a user device cannot communication with the server system, the user device can provide information (e.g., an indicated game action, or video, over a local Wi-Fi or BLUETOOTH connection) to a different user device that is in communication with the server system.

User Interface Example

FIG. 1 illustrates an example user interface 10 for viewing summary data associated with a game. The example user interface 10 is an example of an interactive user interface (e.g., configured to receive user inputs) generated by an application (such as the mobile application described above), or other executable code executing (e.g., running) on a user device (e.g., mobile device). In some implementations, the user interface 10 can alternatively be presented as a web page in a browser running on the user device (e.g., the user device can access a web page hosted by, or otherwise in communication with, a server system such as the game monitoring system 100 described in FIG. 2). The description of FIG. 1 does not need to include all of the elements and features described below or as a single combination. In some implementations, the user interface 10 can include one or more of the elements or features, and can further depend on whether a user is viewing a presently occurring game, or a prior recorded game.

As illustrated, the user interface 10 includes an identification of a selected game 14 (e.g., Team A vs. Team B as illustrated in FIG. 1, the user interface 10 can display a list of games, or a presently occurring game, for selection), and summary data separated into multiple portions under the identification 14. A first portion 16 includes a video display area that displays a video of the selected game 14, and selectable options 18 indicating specific game actions, which occurred during the selected game 14, that can be selected. The selectable options 18 are arranged along a timeline in order of occurrence of each game action, and can represent an approximate location within the video in which each game action occurred. For instance, the length of the portion 16 can correspond to a total length of the video for the selected game 14, and each selectable option 18 can be placed along the total length in relation to the associated game actions occurrence during the game.

Upon selection of a game action (e.g., a game action performed by player 1, designated as P1), the portion 16 can be updated to present a portion of video associated with the game action performed by player 1. For instance, upon a user selection of selectable object P1, the user device displaying the user interface 10 can play or jump to the portion of the video in which player 1 performs the game action; if the video data is not already stored on the user device, this may involve retrieving the associated data from a server system (e.g., providing a request to the server system, and receiving the video data as a stream or as a file for presentation). Furthermore, the user can interact with video controls 20 to pause the portion of video, fast forward the video, or rewind the video (e.g., beyond or prior in time to the portion of video associated with a selectable object). In this way, the user can view the game action, and time periods surrounding the game action that might not be included in the portion of video associated with the game action.

The user interface 10 includes a second portion 12 that illustrates a representation of a game map associated with a sport in which the game is being played. For instance, in the example of FIG. 1, the game map 14 is a representation of a soccer field. The representation includes indications of game actions that one or more players (e.g., players 1-3) have performed during the selected game 14. Each indication of a game action includes a starting location of the player, and a location in which the game action ended. For instance, the user interface 10 is illustrating that player 1 took a shot from a position close to the centerline of the field. Furthermore, each indication of a game action can be configured to be selectable (e.g., via a touch action, a mouse action, and so on), and upon selection of a particular game action, a portion of video associated with the selected game action can be presented (e.g., in the first portion 16, or as a full screen video which can depend on a size of the display of the user device exceeding a threshold). Although not illustrated in FIG. 1, the user interface 10 may include various game action filters that are selectable to only view certain types of game actions (e.g., shots only, shots resulting in goals only, and so on), or game actions by a particular player or category of players.

Utilizing the user interface 10, a spectator can view the selected game as it occurs, or after the game has ended, and view data describing game actions performed by players, and associated portions of video. In this way, a parent or other familial entity can monitor a game without being present at the game.

Furthermore, a user of the user interface 10 can view the entirety of a selected game. Upon an occurrence of an indicated game action (e.g., during the video), the user interface 10 can highlight, or otherwise identify, the game action on the representation of the game map 12.

Figure 2:
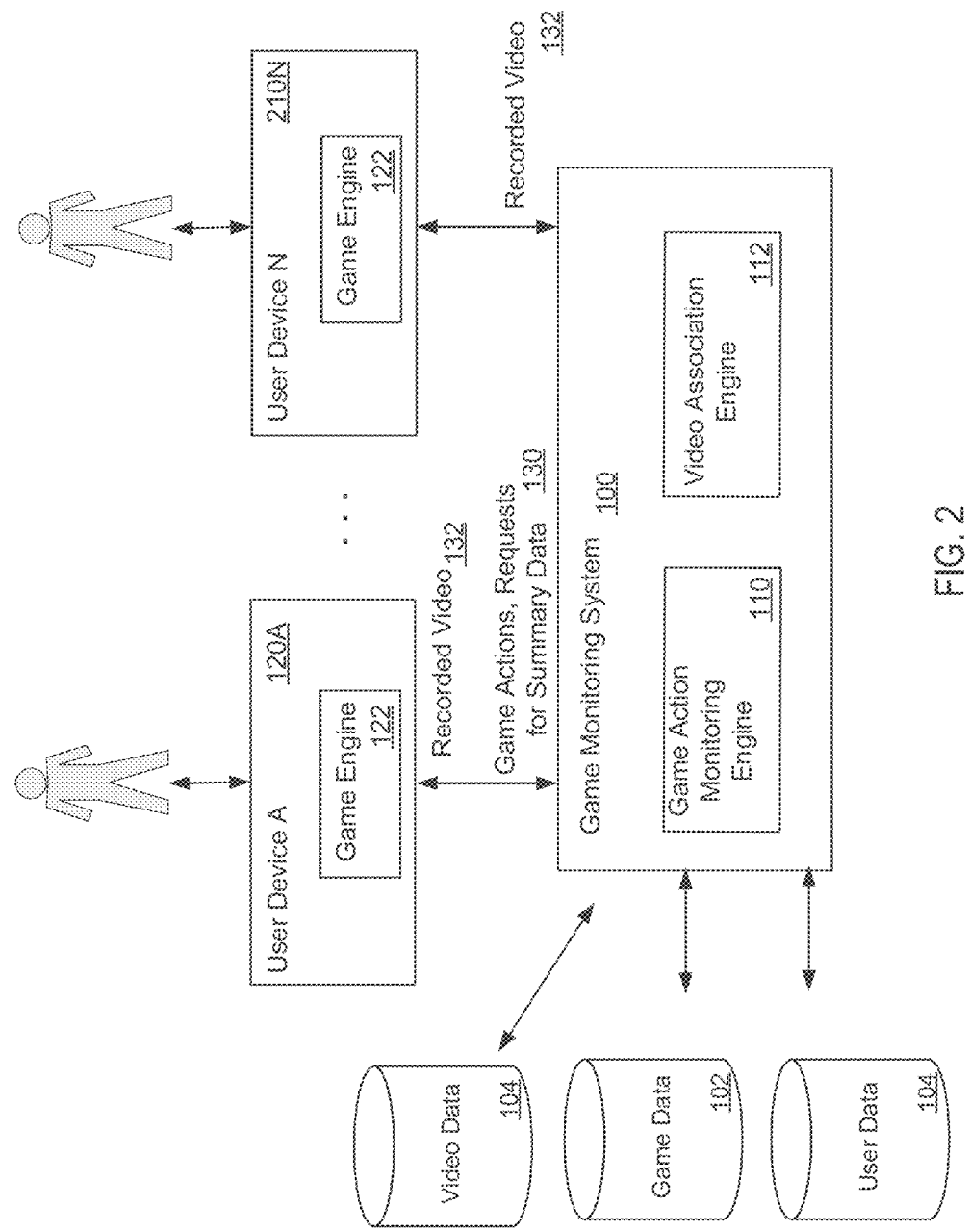
FIG. 2 illustrates a block diagram of an example game monitoring system.

FIG. 2 illustrates a block diagram of an example game monitoring system 100. The game monitoring system 100 can be a system of one or more computers, or one or more virtual machines executing on a system of one or more computers. The game monitoring system 100 is in communication with user devices (e.g. user devices 120A-N) executing an application (e.g., the mobile application described above), or other executable code, configured to provide information to, and receive information from, the game monitoring system 100.

The game monitoring system 100 includes a game action monitoring engine 110 that maintains information describing game actions of multitudes of players (e.g., specific game actions each player engaged in, specific games each game action occurred in, and so on), and information describing each player (e.g., a name of each player, a team associated with each player, a type of sport being played by the team, and so on). To maintain the information, the game action monitoring engine 110 can maintain a game database 102, or in some implementations provide information to a memory system that maintains the game database 102.

The game action monitoring engine 110 can receive indications of game actions of particular players from user devices (e.g., the user device 120A), and update the game database 102 to store information describing the received game actions. Each player can be associated with a particular player identifier (e.g., a value), and the game database 102 can store structured data (e.g., data in tables associated with respective players) describing game actions of each player. A user device (e.g., user device 120A) can send a notification (e.g., or other information describing) a game action of a particular player, and the game action monitoring engine 110 can update the game database 102 to include the received game action data and associated information, including a time of the game action (which may be based on time of entry on the user device 120A), a location of the game the particular player is playing in, and an opposing team the player's team is playing against, and so on. In some implementations, each game a player engages in can be associated with a unique identifier, and the game database 102 can store game actions associated with each game.

The game action monitoring engine 110 further maintains, or is in communication with, a user database 104 that maintains information describing users of the game monitoring system 100 (e.g., a name, a role of the user such as parent, coach, contact information, and so on). Each user can be associated with a user account, and the user can provide log-in information to the game monitoring system 100 for authentication when accessing his/her user device. As described above, each user can be associated with a particular player or team, and the game monitoring system 100 can enforce permissions indicating one or more players, or a particular team, for which each user is permitted to identify game actions. As an example for a particular team, a team coach, or team manager, of the particular team can be associated with a user account with permissions to identify game actions for any player on the particular team. Additionally, each user account can have further permissions related to a particular team, including permissions for identifying a match schedule of the team, identifying an upcoming game match, identifying a cancellation of a game match, and so on.

The game monitoring system 100 includes a video association engine 112 that can receive video 132 (e.g., live streaming video) from a user device (e.g., user device N 210N which can be a mobile device, a video camera, a video camera included in a drone flying over a game, a web cam, and so on), and associate portions of the received video 132 with received indications of game actions (e.g., from user device A 120A, or in some implementations the user device N 120N). In some implementations, the game monitoring system 100 can store information describing each portion as a time stamp of an initial time of the video 132 that displays an associated game action, and an ending time of the video 132. The portion can therefore identify one or more frames of the received video 132. In some implementations, the game monitoring system 100 can store individual portions of video for each associated game action.

The video data 132 and game action data 130 received by the game monitoring system 100 from the user devices may include timestamps that are based on the actual clocks of the respective user devices, or based on game clocks implemented by the mobile application (e.g., as described above, and described below with reference to the game engine 122). The timestamps included in the video data 132 (e.g., time stamps of particular frames of a video, metadata identifying time information) can indicate the time of video capture. The timestamps included with the game action data 130 for a particular game action can indicate, at least approximately, when the game action occurred, and may be based on the time of entry by the user and/or an explicit user indication of when the action occurs. The video association engine 112 can utilize the timestamps included in these two types of data to match indicated game actions to corresponding portions, or clips, of the recorded video(s). For example, if a user of Device A inputs a "shot" game action at 4:27 PM and 33 seconds, the shot action may be matched to a 20-second segment of a video captured by device B, where the segment extends, e.g., from 4:27 PM and 13 seconds to 4:27 PM and 33 seconds.

Additionally, the video association engine 112 can provide a portion of video associated with an indicated game action for presentation on one or more user devices that can edit the portion to better correspond to the game action (e.g., only user devices of users with associated editing permissions). For instance, a coach, or player or team administrator, can receive information describing a game action, and an associated video of the game action. The coach can request video prior, and subsequent to, the portion of video (e.g., through user controls described above in FIG. 1), and define new boundaries of the portion (e.g., updated time stamps or identifications of frames of the video). The newly defined portion can then be stored by video association engine 112. In some implementations, multiple users can edit a video, and upon a conflict between multiple users of the boundaries of apportion of video, the video association engine can request that the users decide on a same (or approximately similar) boundary, or the video association engine can determine an average start and stop time of the portion of video.

User devices (e.g., user devices 120A-N) can execute, or run, a game engine 122 (e.g., an application downloaded from an application store) that provides information to, and receives information from, the game monitoring system 100. As described above, users of the user devices can provide inputs to respective user devices to indicate game actions of players. Additionally, users can provide requests for summary data 130 of particular players, or particular teams. Users can edit portions of video associated with game actions, and so on, as will be described below. Furthermore, a user device can provide video to the game monitoring system 100 (e.g., through a network connection, or by first providing the video to a user device in communication with the game monitoring system 100), without running the game engine 122. For instance, as will be further described below, a drone can fly over a game, record video, and provide the video to the game monitoring system 100, or a user device in communication with the game monitoring system 100.

Figure 3:
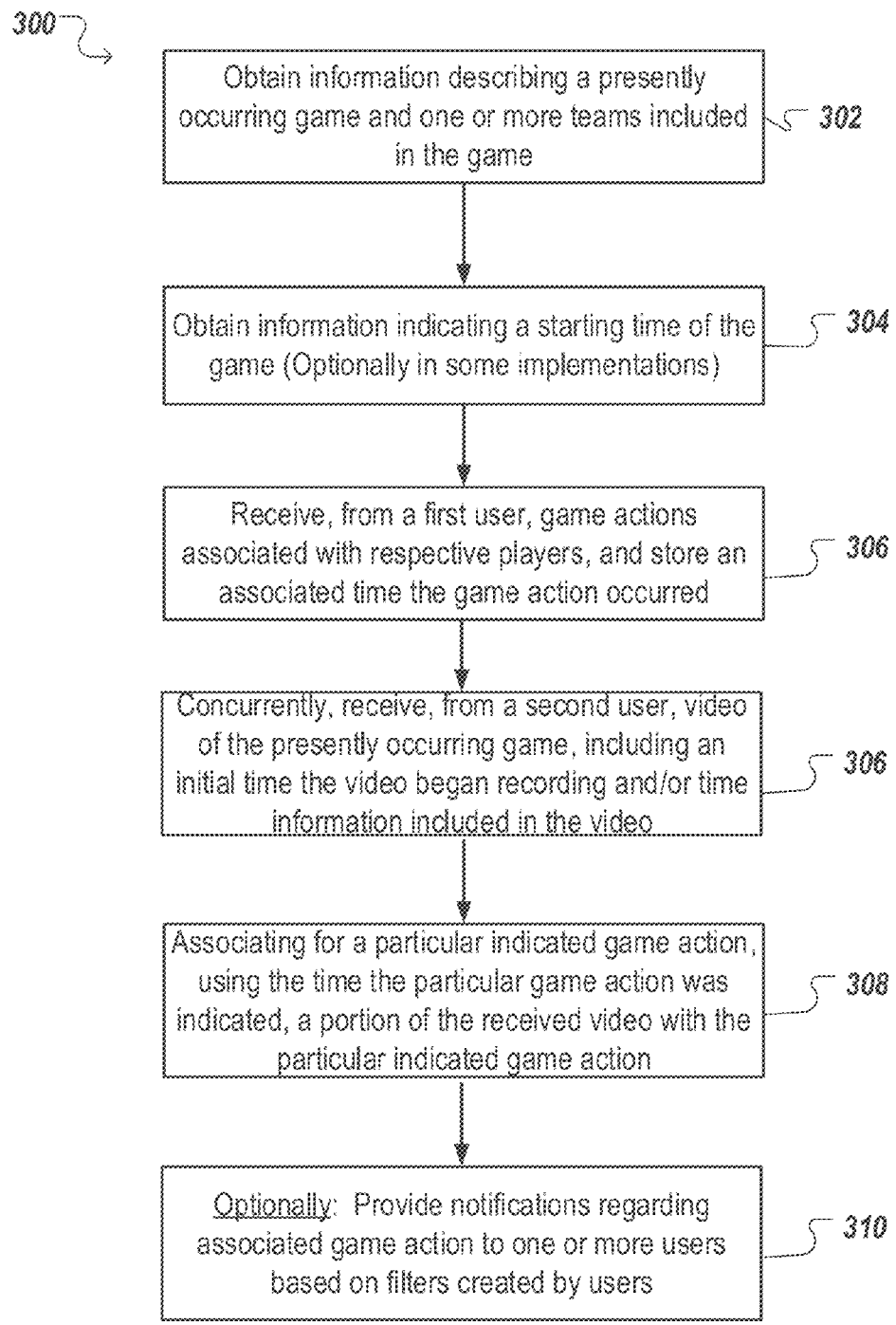
FIG. 3 is a flowchart of an example process for associating portions of video with indicated game actions.

FIG. 3 is a flowchart of an example process 300 for associating portions of video with indicated game actions. For convenience, the example process 300 will be described as being performed by a system of one or more computers (e.g., the game monitoring system 100).

The system obtains information describing a presently occurring, or upcoming, game and one or more teams included in the game (block 302). A user viewing a presently occurring game can indicate game actions of particular players engaged in the game. To indicate game actions, each user can access his/her user device, and provide log-in information for authentication to the system. Upon authentication, the system can provide information to the user device indicating one or more games associated with the user that are presently occurring, are about to occur within a threshold amount of time (e.g., an hour, two hours), or a next upcoming game. The user of the user device can select a game, and the system can provide information identifying players on the team associated with the user, and information describing the selected game (e.g., a name of the opposing team, a location of the game, and so on).

The system can obtain information describing a presently occurring, or upcoming, game from stored information identifying game schedules of teams. For instance, at the start of a game season, a particular user (e.g., a team coach, a team manager, and so on), can access his/her user device and input information describing a schedule of his/her associated team. The information can include opposing team names and times each game is to take place. Additionally, a league associated with teams can generate schedule information, which the system can obtain and import (e.g., store). This way, the coach can access his/her user device and the schedule information can be presented. In some implementations, the particular user can access a web page associated with the system, and enter the team schedule information for storage by the system. Furthermore, in some implementations, the system can access a document (e.g., a web page) that describes team schedules, and parse the document to determine team schedules of multitudes of teams.

In this way, when a user accesses his/her user device, the system can authenticate the user, obtain an associated team of the user, and determine an upcoming, or presently occurring, game that is the closest in time to the authentication time of the user.

In some implementations (e.g., in an implementation where the system does not have access to team schedules), a user can manually input information describing a presently occurring, or upcoming, game. For instance, the user can provide input specifying an opposing team name (e.g., the user can enter the team name with a keyboard, or with speech), and the system can store information describing the game. In this way, after the system receives the manually inputted game, if a different user associated with the same team accesses his/her user device, the system can provide an identification of the game for selection.

The system obtains information indicating a starting time of the game (block 304). The starting time can be used to indicate a time into a game that each game action occurred (e.g., when providing summary data of a presently occurring game, or previous game, as described in FIG. 1).

As described above, in some implementations the system can access schedules of games to determine a starting time for a game, and the system can assign the starting time included in a schedule as the starting time of the game.

Alternatively, a particular user of a user device in communication with the system can have associated permissions to indicate an actual starting time of the game (e.g., the game can start earlier or later than a scheduled time). That is, at the start of a game, the user can access his/her user device (e.g., the mobile application executing on the user device as described above), and interact with the user device to indicate that the game has begun. The indicated starting time can be provided to other user devices that indicate game actions and/or record video to synchronize the start of the game, and time information of indicated game actions and recorded video, across the user devices.

In some implementations, any user can indicate that a game has begun, and the system can store a starting time that is the earliest of the indications, or with the earliest starting time that is within a particular variance of all the indicated starting times.

In some implementations, the system does not need to obtain a time the game begun, and can associate a portion of a recorded video with a game action using a time associated with an indication of the game action and time information associated with the recorded video.

The system receives game actions associated with respective players, and stores an associated time each game action occurred (block 306). As described above, users can indicate game actions, and the system can receive information describing each game action (e.g., identification of a player, a type of game action, a starting location of the game action, an ending location of the game action, an outcome of the game action, and so on).

When receiving a game action, the system stores a time stamp associated with the game action, which can include a time the server received the indication, a time provided with the indication of when the game action was indicated on a user device (e.g., converted into a same time zone as the system), or a time of when the game action was indicated on a user device with respect to a game clock initiated by a user of the user device, or initiated by a different user (e.g., a coach, or team administrator, synchronized as described above). Additionally, in some implementations the system can determine a time each game action was indicated with respect to the start of the game (e.g., as described above in step 304). That is, the system can determine a time, from the start of the game, that the game action was indicated. In this way, the system can obtain information identifying when in the course of a game each indicated game action occurred (e.g., 5 minutes into the game, 10 minutes, 13 minutes into the game, and so on).

In some implementations, a user can identify that he/she is indicating a game action that occurred a selectable amount of time prior to the present. For instance, the user can indicate that he/she is indicating a game action that occurred 2 minutes ago. The system can receive this information, and modify the time stamp associated with the game action.

The system receives video of the presently occurring game (block 306). One or more users can provide video (e.g., recorded video) as a live-stream to the system for storage. For instance, a particular user can execute a mobile application (e.g., as described above), select the presently occurring game, and record video of the game from his/her vantage point. The mobile application can then provide the recorded video to the system for storage. In these implementations, the mobile application can include information identifying time information associated with the video (e.g., as metadata, based on a game clock, a synchronized game clock, a system time, and so on). In some implementations, alternative to utilizing the mobile application, the particular user can utilize a camera that provides video to the system (e.g., over a network), or provides video to a user device that is in communication with the system.

Additionally, the particular user can record the video, and the system can receive a completed video of the game after the game has ended (e.g., the particular user can upload the video to the system for storage after arriving home). The system can then associate game actions with portions of video through time information associated with the video (e.g., metadata of the video). For instance, the recorded video can include an identification of when the video began, and the system can compare the initial recording time to times of when game actions were indicated. Additionally, the recorded video can include time information (e.g., of each frame, or one or more frames, in the video), for instance included as metadata by the user device (e.g., based on a game clock, or a system time, or as text identifying times on each frame of the video), and the system can compare the time information to times of when game actions were indicated. In some cases, a video camera might have an incorrect time (e.g., the user improperly set up the camera). In some implementations, the system can provide information to the uploading user requesting when he/she began recording.

The system associates an indicated game action with a portion of the received video that shows the game action (block 308). The system obtains a time the game action was indicated (e.g., as described above in step 306), and compares the time the game action was indicated to time information associated with the video, to determine the portion of the video that displays the game action. For instance, the system can compare the time the game action was indicated with time stamps of each frame in the video.

The system can define a portion of video showing the game action as a portion of video extending a first time amount prior to the indication of the game action to a second time amount prior, or subsequent, to the indication of the game action. The first time amount and second time amount can be different time amounts, for instance the first time amount can be 3 seconds, 5 seconds, 11 seconds, 30 seconds, and the second time amount can be 4 seconds, 12 seconds, 20 seconds, and so on. In this way, the portion of video associated with the indicated game action can be defined as being a video clip that ends shortly before the indication, and begins a sufficient amount of time prior to the indication to view the game action.

For instance, the game action could have been indicated (e.g., by a user) at 2:30:00 pm (e.g., based off a game clock or system time). The system can determine that the portion of video should start a first time amount prior to 2:30:00 pm (e.g., 2:29:15 pm), and a second time amount prior to 2:30:00 pm (e.g., 2:29:45 pm). Similarly, a game action could have been indicated (e.g., by a user) at 30 minutes into a game (e.g., based off a synchronized game clock as described above). The system can determine that the portion of video should start a first time amount prior to 30 minutes into the game (e.g., 29:15 into the game), and a second time amount prior to 30 minutes into the game (e.g., 29:45 into the game). As described above, the system can assume that an indicating user indicated the game action a particular amount of time after its completion (e.g., 10 seconds, 15 seconds, and so on) which can define, or inform, the second time period.

In this way, since the video includes time information (e.g., as metadata, which can be based off a time determined by the user device such as a system time, or according to a synchronized game clock), portions of video can be correlated, and associated, to game actions during a presently occurring game, or after a presently occurring game. Furthermore, if a user device experiences network connectivity issues, and cannot provide an indication of a game action substantially in real-time to the system, the system can still correlate the game action to a portion of video. That is, the game action can be provided to the system with information identifying a time the user indicated the game action, and the system can correlate the time to time information in the video.

In some implementations, a user can provide an initial indication that a game action is presently being performed (e.g., the user can interact with one or more selectable objects in a user interface to specify a player performing a type of game action, and the user can later enter a location of the game action, and outcome of the game action), and the system can receive information identifying the indication. In these implementations, the first and second time periods can be different than as described above, for instance the system can assume that the beginning of the game action occurred more recently since the user has to interact with less user interface elements to indicate a presently occurring game action. Therefore, it's likely the game action will not be completed upon the initial indication that a game action is presently occurring, and the system can assume that the second time is an amount of time subsequent to receiving the initial indication. The user can also provide additional information describing the game action (e.g., an outcome of the game action and so on). That is, the user can indicate a presently occurring game action (e.g., a player performed a pass), and then additional information (e.g., the outcome of the pass) as it happens. For instance, if a player catches a thrown football, the user can indicate the catch, and then indicate the outcome when it occurs (e.g., touchdown). After indicating the outcome, the system can define the portion of video as being a second time amount prior to the indication of the outcome (e.g., 3 seconds, 5 seconds, 8 seconds). Since the user has to interact with less user interface elements to identify the outcome of the game action, the second time amount can be less than the second time amount when the user enters the full description of the game action.

The first time amount and second time amount can be different based on a type of game action indicated. For instance, a game action can be a block on goal, and the first time amount and second time amount can define a shorter portion of video than a different game action (e.g., a football pass to a runner who might run with the ball for a long period of time). In some implementations, an indicating user can identify that the portion of video is to be longer than a default. For instance, the user can indicate that the portion should be 45 seconds, instead of 30 seconds as indicated above.

In some implementations, a video camera can record video of the game and provide the recorded video to a user device executing the mobile application, which can then provide the video to the system, or can store the video to later be provided to the system. The user device can include time information (e.g., as described above), if the video does not include time information or is different than time information of the user device (e.g., time information of a synchronized game clock). Furthermore, when providing video from a video camera directly to the system (e.g., as an upload), a user of the video camera can indicate a time the video began, and when any pauses in the recording began and ended, and the system can determine time information for the video.

Additionally, in some implementations if the video does not include time information (e.g., due to a video camera not associating metadata time information, or the time information being incorrect), and a video camera is providing the video directly to the system, the system can determine whether the video is being provided to the system in substantially real-time, and if so, the system can associate portions of the video similar to above. For instance, if a video is being received by the system, and a game action is indicated at 2:30:00 pm, the system can identify that the portion of video should begin a first time amount prior to the indication, and a second time amount prior (e.g., the portion is the video as it was received at 2:29:15-2:29:45). However, the system can determine that the video is not being streamed in substantially real-time (e.g., a user can indicate bad network connectivity, the system can receive information from the user device indicating bad network connectivity, or the system can determine that it's not receiving a consistent stream of the video). In this case, the system can determine an offset from the time the video was first received (e.g., as described below), or the system can associate each received frame with a time stamp the system generates, and correlate portions of video as described above. For instance, if the system receives substantially-real time video from 2:00:00 pm-2:30:00 pm, and then receives intermittent video thereafter, the system can generate time stamp information for each video frame received (e.g., using information identifying a particular number of frames per second in a video). That is, if the system receives 5 seconds of video (e.g., as a single download from the user device when it regains network connectivity) at 2:30:10, after not receiving video from 2:30:00-2:30:10, the system can determine that the 5 seconds of video should actually be assigned time stamps of 2:30:00-2:30:05. Therefore, even without the video including time information (e.g., as metadata), the system can still correlate video with indicated game actions. In some implementations, if the system does not receive video for greater than a threshold (e.g., 1 minute, 5 minutes, 10 minutes), the system can assume that the video has been paused due to a break (e.g., half time break in the game). Therefore, when the system receives video again, the system can add the break time as an offset to the time information.

As described above, in some implementations if the video does not include time information (e.g., due to a video camera not associating metadata time information, or the time information being incorrect), the system can compare a time the video was first received as a point of reference when determining the portion of video.

For instance, upon receipt of the video, the system can determine an offset into the start of the game of when the video began recording. To effect this determination, the system can obtain a time stamp of when the video was received by the system, or when a user device began providing the video (e.g., a time stamp determined by the user device), and compare the time stamp to a time associated with the start of the game (e.g., as described above in step 304). The system can then determine a time, from the start of the game, at which the video began recording. For instance, if a game was indicated as starting at 2:00:00 pm, and the system received video of the game at 2:03:00 pm, then the system can determine that the offset is 3 minutes.

The system can then use the offset to determine the portion of video corresponding to the game action. As an example, if the game action was indicated at 2:30:00 pm, the system can determine that the video corresponding to a time the game action was indicated is 27 minutes into the video, using the example 3 minute offset described above. The system can then determine boundaries of the video, using the first time and the second time, as described above (e.g., the portion of video can be 26:15 into the video and end 26:45 into the video.)

In this way, portions of video can still be correlated, and associated, to game actions during a presently occurring game, or after a presently occurring game.

The system, optionally, provides notifications regarding the associated game action to one or more users (block 310). As described above, users can spectate the presently occurring game (e.g., as described above in FIG. 1), and view video of the presently occurring game (e.g., portions of video and/or the full video of the game), and indications of game actions.

Additionally, users that are unable to actively monitor the presently occurring game, can identify that they wish to receive notifications for indicated game actions associated with particular players on a team, any player on the team, and/or particular types of game actions. For instance, a user can indicate particular filters (e.g., using his/her user device, or a web page in communication with the system), to receive all indications of game actions associated with a player (e.g., the user's son or daughter), indications of specific types of game actions associated with the player (e.g., the user's son or daughter taking a shot on goal), and/or types of game actions associated with all players on a team.

The system generates notifications to provide to each user that has indicated he/she is to receive notifications regarding the associated game action. In some implementations, a notification can provided as to a user device of each user (e.g., as a push notification, as a text message, and so on). In some implementations, a notification can be provided as an e-mail, as a social network message or status, and so on. The notification can describe the associated game action (e.g., the system can generate text identifying the associated game action), and in some implementations the notification can include a link to a portion of video associated with the indicated game action (e.g., a link to a web page in communication with, or controlled by, the system, or to a file associated with the portion). Additionally, in some implementations, the system can provide a link that, when selected, causes the mobile application (e.g., described above) to open. The mobile application can then describe the associated game action (e.g., illustrate the game action on a representation of a game map), and/or display the portion of video associated with the game action.

Figure 4:
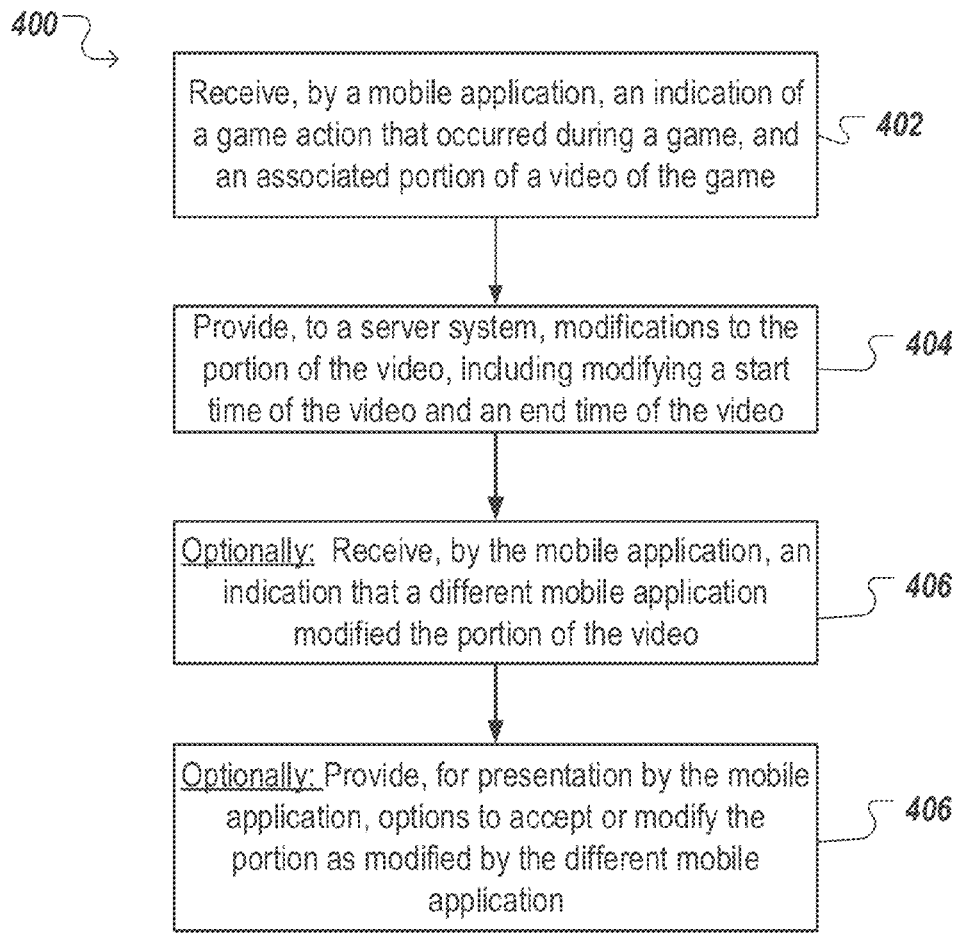
FIG. 4 is a flowchart of an example process for modifying a portion of a video associated with a game action.

FIG. 4 is a flowchart of an example process 400 for modifying a portion of a video associated with a game action. For convenience, the example process 400 will be described as being performed by a user device of one or more processors (e.g., the user device 120A executing the game engine 122).

The process 400 enables one or more users to modify a portion of a video of a game that purports to show a game action. For instance, a reviewing user (e.g., a coach, a parent, a team administrator, a person with permissions to edit portions of video) can receive (e.g., during a presently occurring game, or after a game) information describing each indicated game action and an associated portion of video of the game action. If the reviewing user determines that the portion does not include the game action, or the length of the portion should be altered, the reviewing user can utilize his/her user device to modify the portion. After modification, the system can receive the modified portion (e.g., information describing the modification, such as updated time stamps of the beginning and end of the portion). In some implementations, only users that recorded the video, or indicated a game action, can modify portions of video.

In some implementations, each user reviewing a game action or a portion of a video can edit portions associated with game actions at his/her own discretion. The system can store information identifying the portions and associate the information with the user. In this way, each user can create his/her own preferred video clip of game actions.

Additionally, a reviewing user of portions of video of game actions can indicate that the portions are generally a set time offset off from what they should be. The reviewing user can then indicate to the system (e.g., using his/her user device) that the videos should all be shifted by a particular amount of milliseconds, seconds, minutes, in time, and the system can correlate all, or some, of the portions of video with indicated game actions using the offset. In some implementations the system can determine that the portions of video are not properly correlated with indicated game actions (e.g., after determining that a threshold number of portions of video have been modified by one or more time amounts with variance to a mean time amount lower than a threshold), and update the remaining portions of video (e.g., update time stamps of the portions, such as by modifying the portions according to the mean time amount).

The user device receives an indication of a game action that occurred during a game, and an associated portion of a video of the game (block 402). As described above, particular users (e.g., reviewing users, such as users with permissions to modify portions of video, or users that have indicated they wish to modify portions of video, or users that have indicated their desire to receive updates for all game actions of particular players) can receive an indication of a game action, and an associated portion of a video of the game.

In some implementations, the user device can receive information describing all game actions that have occurred in a game (e.g., a game that has already occurred, or a presently occurring game), and a user of the user device can select a particular game action to receive a portion of video of the game action (e.g., as illustrated in FIG. 1).

The user device provides modifications to the portion of the video to the system (block 404). The user of the user device can utilize a mobile application executing on the user device (e.g., as described above) to modify the boundaries of the portion of video (e.g., modify a start time of the video and an end time of the video), or the user can access an interactive document (e.g., a web page) and modify the portion of video. The system can provide the portion of the video, and the user device can request to view earlier or later sections of the video. For instance, the user can interact with a rewind, or fast forward, selectable object (e.g., button) and view earlier or later sections of the video. The system can stream the video requested by the user, and the user can then interact with/his user device to indicate an updated starting or ending time of the portion.

After modifying the portion of video, the system can receive an updated start and stop time of the portion of video, and associate the updated times with the portion of video.

The user device receives an indication that a different user modified the portion of video differently (block 406). In some implementations, a different user can modify the boundaries (e.g., start and stop time of portions of videos) of portions of videos, and the system can provide information to each reviewing user indicating that the portion has been modified differently.

The user device provides selectable options to accept or modify the portion as modified by the different user (block 406). The user device can present the portion as modified by the different user for presentation, and the user can determine whether the different portion is acceptable.

Alternatively, the system can automatically determine a resolution to the differently modified portions. For instance, the system can determine a measure of central tendency of the start times and stop times of the portions of video. Additionally, the system can select an earliest start time, and a latest stop time, to create a portion with the broadest time coverage. Furthermore, the system can select an earliest start time that is within particular variances of all the indicated start times and stop times of the portions.

Figure 5:
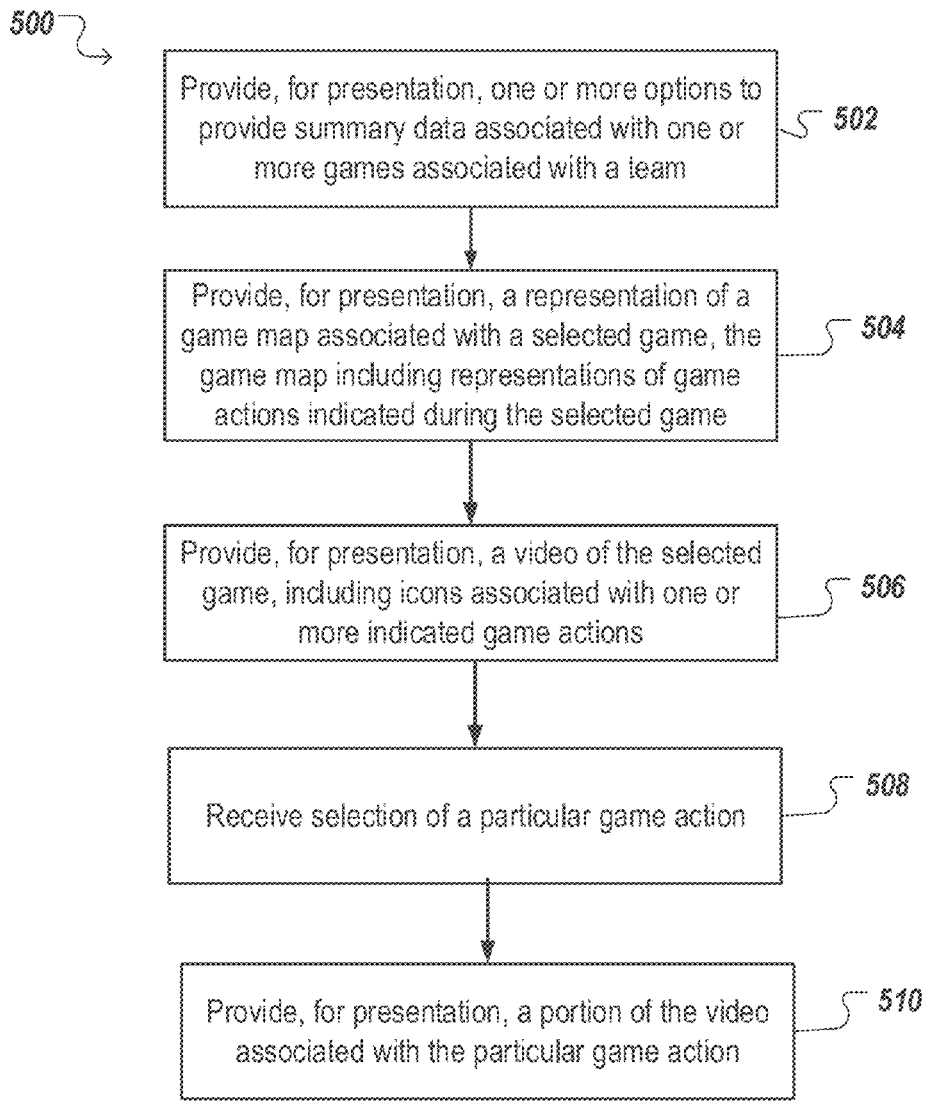
FIG. 5 is a flowchart of an example process for providing summary data associated with a game

FIG. 5 is a flowchart of an example process 500 for providing summary data associated with a game. For convenience, the example process 500 will be described as being performed by a user device of one or more processors (e.g., the user device 120A executing the game engine 122). The example process 500 can also be implemented as a web page in communication with the game monitoring system 100. That is, a user can access a web page, interact and view the web page as if he/she were viewing the game engine 122 (e.g., mobile application described above).

The user device presents selectable options to provide summary data associated with one or more games in which a team played. The user of the user device can then select a particular game to view associated summary data. In some implementations, the user device can automatically select a presently occurring game, enabling the user to view the game in substantially real-time and view summary data of game actions that have been indicated during the game.

The user device presents a representation of a game map associated with the selected game (block 504). As illustrated in FIG. 1, the user device can obtain a representation of a game map associated with a sport being played, and also obtain indications of game actions that have occurred during the game (e.g., from the system as described above).

The user device can present visual representations of the game actions on the game map, including one or more of an identifier of a player, a starting location of the game action, an ending location of the game action, a type of game action, an outcome of the game action, and so on. Furthermore, as illustrated in FIG. 1, the user device can present video of the game (e.g., a live-stream of the presently occurring game, or a particular portion of video associated with a selected game action), and indications of times at which game actions occurred during the video.

In some implementations, the user device can include a list (e.g., below or in place of the representation of the game map) of game actions and information describing each game action (e.g., respective player, type of game action, and so on). Additionally, in some implementations, the user device can not include video of the game, until the user selects a particular game action. The user device can then present a portion of the video associated with the selected game action.

The user device receives selection of a particular game action (block 508). As described above, the user can interact with the user device to select the particular game action. For instance, the user can select an icon displayed in a portion that includes a video of the game, the icon corresponding to the particular game action. Additionally, the user can select the particular game action that is included as a visual representation on the representation of the game map. Furthermore, the user can select the particular game action that is included in a list of game actions.

The user device presents a portion of video associated with the particular game action (block 510). As illustrated in FIG. 1, the portion of video can be presented on the user device in a particular area (e.g., in the first portion 16). Alternatively, the portion of video can fill up substantially all of the user device's screen, and upon completion of the portion of video, the user device can present information describing the game (e.g., representation of the game map, and so on).

User Interfaces

Figure 6:
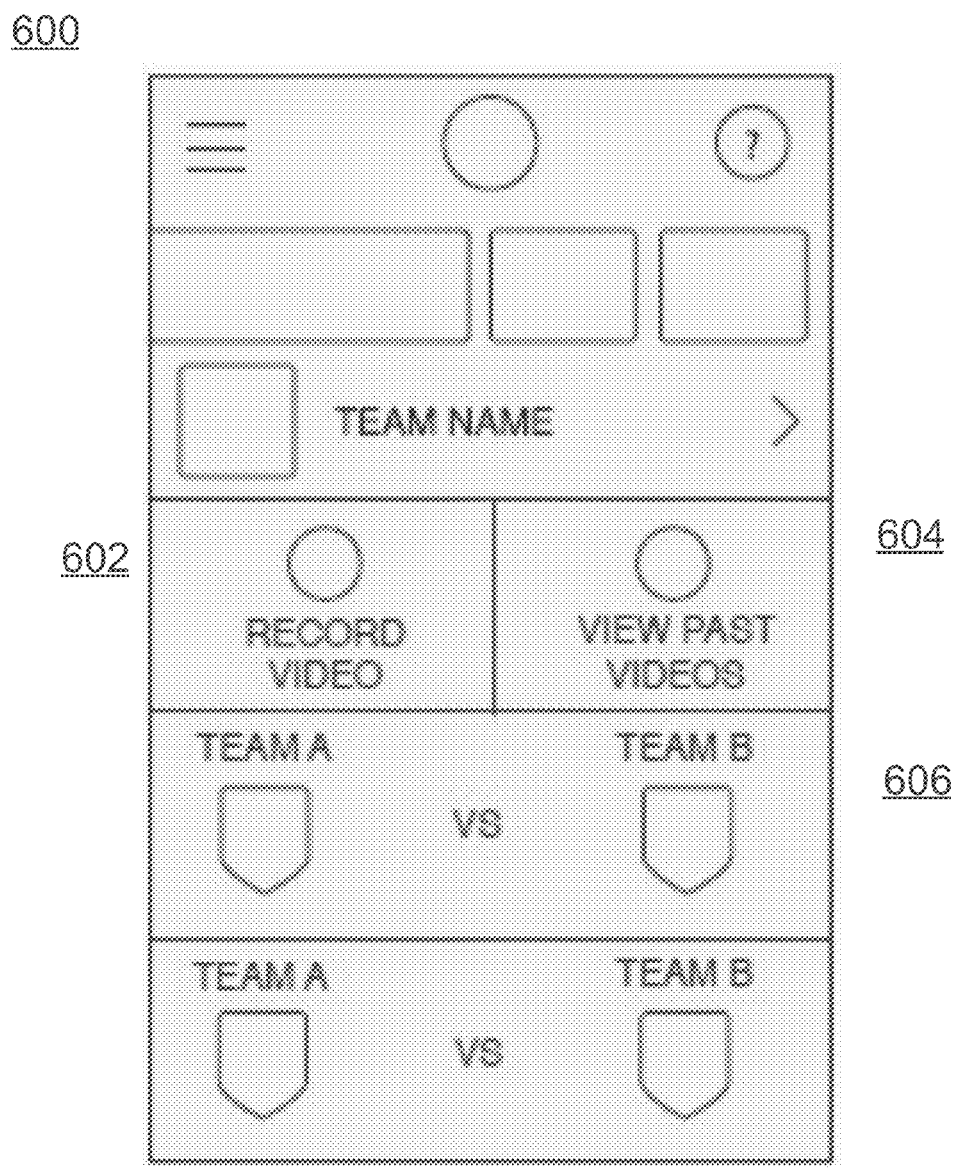
FIG. 6 illustrates an example user interface for recording a video or viewing previously recorded videos.

User interfaces described in FIGS. 1, and 6, are examples of interactive user interfaces presented on, and generated in part by, a user device (e.g., a mobile device, a tablet, a wearable device, a laptop, a computer). In some implementations, the user interfaces can be presented on the user device as a document (e.g., a web page generated by the game monitoring system 100) in an application (e.g., a web browser), with the document received from a system (e.g., the game monitoring system 100) over a network (e.g., the Internet). In implementations in which the user interfaces are presented as a document (e.g., a web page), any interactions with the document can be provided to the system (e.g., the game monitoring system 100) for processing, and/or the document can include executable code (e.g., Javascript, Java, and so on) that can implement any, or all, functionality described above (e.g., determining coordinates of a user input on a graphical representation of a game map, and so on), and provide information indicating the functionality to the system (e.g., the game monitoring system 100 can receive indications of game actions as described above).

Each of the described user interfaces includes user selectable options that upon selection can cause the user device to obtain associated information (e.g., from local storage, from an outside system such as a search engine, or from the game monitoring system 100), determine updated information, and modify, or generate, user interface data.

As described above, a user of the user device can provide user account information to the user device, which can get authenticated by a system (e.g., the game monitoring system 100). Upon authentication, the user can device can present user interfaces associated with the user, including information relevant to one or more teams the user is associated with.

FIG. 6 illustrates an example user interface 600 for recording a video or viewing previously recorded videos. The user interface 600 includes selectable options to record a video 602 and to view prior recorded videos 604. Upon selection of the option to record a video 602, the user interface 600 can be updated to provide functionality to actively record a video and provide the recorded video (e.g., as a stream), with time information (e.g., as described above) to the game monitoring system 100. Additionally, upon selection of the option to view prior videos 604, the user interface can be updated to provide identifications of particular game matches the user can view, or the user can select a game from a list 606 (e.g., and view a user interface as described in FIG. 1). The user can then select a game, and view video of the selected game. Additionally, upon selection of a game, the user interface 600 can be updated to present a summary of the selected game (e.g., as described in FIG. 1).

Video Camera Worn by Player or Part of a Drone

As described above, a user device, or a video camera, can capture video of a presently occurring game, and provide the video (e.g., substantially in real-time or after the game) to the game monitoring system 100. In some implementations, one or more players on a team can wear a video camera, and the game monitoring system 100 can obtain video footage as captured by the video camera.

Each worn video camera can be associated with a player, and if a game action is indicated for the player, the game monitoring system 100 can associate a portion of video from the worn video camera with the indicated game action. Additionally, the system can associate a portion of video from a game camera not worn by the player (e.g., from a parent filming the game on the sidelines), and a user later viewing the game (e.g., summary data as described in FIG. 1) can select a viewpoint he/she is interested in. In this way, the user can view a first person view of the game action, and/or view a more normal sideline viewpoint of the game action. In some implementations, the video cameras worn by players can include functionality to provide video to a user device in communication with the game monitoring system 100, or in some implementations the video from the video cameras can be provided after a game has finished to the game monitoring system 100.

Additionally, in some implementations the game monitoring system 100 can obtain portions of video from players adjacent to a player performing a game action, and associate the portions of video from the adjacent players with the game action. To obtain portions of video from adjacent players, the game monitoring system 100 can utilize locations (e.g., GPS coordinates) of players, the system can determine based on a location of the game action that a particular player is likely to have a view (e.g., a goalie will likely have a view of a player taking a shot on the goal), or a user indicating a game action can provide information identifying a player that has a good view. These adjacent views can also be presented to a user viewing the game (e.g., as described above in FIG. 1).

Similarly, as described above a drone can capture video footage of a game, and the drone footage can be utilized by the game monitoring system 100. In this way, a user can view a top-down view of a game or a selected game action, along with other viewpoints of the game action (e.g., a video camera worn by a player, a side-line view, and so on). In some implementations, the game monitoring system 100 can obtain location information from the drone (e.g., as it flies over the game), and correlate the location information to times identified by the video (e.g., time stamps associated with frames of the video). When associating portions of video from the drone with indicated game actions, the game monitoring system 100 can determine whether the drone is flying over a player performing the game action, and if not, the game monitoring system 100 can edit the portion of video to include only a portion of the video that is determined to include the player. For instance, if a player is on the far right of the field, and the drone is in the middle, the game monitoring system 100 can include a portion of video that corresponds to the far right of the field.

Additional Embodiments

In some implementations, the system can receive multiple videos of a same game, and the system can associate portions of each video with indicated game actions. When providing a portion of video for presentation on a user device, the system can determine a best portion to provide to the user device. For instance, the best portion can come from a video taken by a particular user (e.g., a designated video recorder, or a user can designate the particular user being his/her preference). Additionally, the system can record a location of each person recording video (e.g., using GPS coordinates), and determine a best recording as corresponding to the recording nearest to the starting and/or ending location of an indicated game action. In some implementations, the system can provide information describing locations of each recording, and the user can select a recording he/she is interested in when requesting a portion of video associated with a game action.

As generally described above, a user indicating game actions on a user device generally does not also record video of a game, and thus provide both the game action and recorded video to the game monitoring system 100. However, in some implementations, a single user device can be used to indicate game actions and provided video. For instance, a user of the user device can execute the mobile application (e.g., as described above), and indicate that he/she is going to record video. While recording video the user can interact with the mobile application (e.g., select an option, such as double tapping on the video, swiping on the video, and so on) to indicate that he/she is going to indicate a game action. The mobile application can present selectable options to indicate the game action, and can present the recorded video at the same time (e.g., on the same display screen, which can be based on a size of the display exceeding a threshold). Furthermore, after indicating a game action, the mobile application can present a portion of video to be associated with the game action, and the user can modify the portion (e.g., as described above in FIG. 4).

In some implementations, a first user device can communicate with a second user device (e.g., over BLUETOOTH, or Wi-Fi), and the user devices can effect functionality of the system (e.g., the game monitoring system 100). For instance, the second user device can record a presently occurring game, and the first user device can provide indications of game actions. Upon receipt of a game action by the first user device, the first user device can provide information describing the game action to the second user device, and the second user device can determine a portion of video corresponding to the game action.

In some implementations, portions of video and recorded videos of games can be maintained by a server system that hosts a web page. The web page can be accessed by particular people (e.g., players on a particular team, coaches/administrative people associated with the team, family members, and so on), who can view previous games, or presently occurring games. Additionally, the videos, and portions of videos, can be indexed according to indicated game actions. Users of the web page can provide requests for particular information (e.g., as non-structured text describing the request, or as structured text), including particular game actions and/or portions of video. For instance, a user can provide a search query such as "Show shots on goal by Adam", and the server system can determine (e.g., from metadata describing indicated game actions), game actions of player Adam that were shots on goal. In some implementations, all such determined results from the search query can be presented in succession (e.g., portions of video associated with the game actions), and/or a listing of all game actions (e.g., including a representation of a game map and information describing each indicated game action) can be presented and configured for individual selection. Upon selection of a game action, a portion of video associated with the game action can be presented.

In some implementations, the system can determine portions of video based in part on visual processing of recorded video. For instance, the system can determine a likely ending timestamp of a portion of video by analyzing video frames. In this way, the system can determine that a portion of video illustrating a shot on goal can end at a particular time.

Tracker

A variety of technologies exist to monitor physical performance of players engaged in a sport, including heart rate, exertion, distance traveled, specific muscles that are being activated at a given time, tears of muscles or ligaments, and so on. In some implementations, the game monitoring system 100 can receive information from similar technology being worn by players, and associate the physical characteristics of the players with indications of game actions and portions of video.

The game monitoring system 100 can determine statistical analyses of the physical performance characteristics of players with regards to specific types of game actions. For instance, the game monitoring system 100 can determine that when a particular player is stressed (e.g., has a high heart rate), the player is more likely to miss a shot on a goal. In this way, a coach can determine that a player would be better served by resting for a minute, or temporarily assuming different positions in the team.

Users of the game monitoring system 100 (e.g., when viewing summary data of a game), can view physical performance characteristics of players along with indications of game actions and portions of video. Additionally, the game monitoring system 100 can identify particular characteristics, and when a user is viewing summary data of a game, the game monitoring system 100 can highlight (e.g., flag) a game action of a player that occurred while the player was exhibiting the particular physical characteristics. For instance, if a player injured themselves, a user viewing a game can view that the game action was associated with an injury, and view a portion of video that shows the injury.

Manual Tagging

The description above includes methods and systems for associating video (e.g., portions of video, video clips, and so on) of a sports game (e.g., a team game, a professional game, a practice game, a pickup game, and so on) with game actions (e.g., shots) specified by spectators of the sports game. As described in FIGS. 2-3, using time reference data the game monitoring system 100 can determine (e.g., automatically determine) a portion of video that corresponds to a particular indicated game action. In this way, the game monitoring system 100 can maintain information describing portions of video with associated game actions, and can provide information to a user device of a user viewing information associated with one or more sports games. For instance, as described above, the user can view information describing indicated game actions (e.g., textual information identifying players associated with the indicated game actions, outcomes of the game actions, and optionally a representation of a game map that graphically illustrates the game action), and the user can request portions of video showing the indicated game actions. Therefore, the game monitoring system 100 can provide succinct overviews of sports games, and can enable a user to view graphical information describing specific game actions that occurred during the sports games (e.g., player location when taking a shot, outcome of the shot, and so on), along with portions of video showing each game action, or video of the entirety of the sports game.

As will be described, in some implementations spectators of a sports game can record (e.g., indicate) game actions occurring during the sports game, and subsequently, a user of a user device viewing recorded video of the sports game can manually associate portions of the video with the recorded game actions. For example, the automatic association described above may fail for one or more reasons (e.g., the time data can be corrupted), such that a manual tagging can be preferable or optionally required. The user device can execute a mobile application (e.g., downloaded from an application 'app' store) that is in communication with the game monitoring system 100, and can present a video of a sports game to a user of the user device (e.g., requested by the user) along with identifiers of game actions indicated by spectators during the sports game. While watching the video, the user can designate a particular game action as being shown in a portion of video the user is watching. The game monitoring system 100 can then associate the particular game action with the portion of video. Similarly, while watching the video, the user can pause a video, and then select an identifier of a game action to be associated with a portion of video associated with the paused location. In some implementations, the user can be watching a live streaming video of a sports game, or the user can be watching a recorded video of a sports game that occurred at a prior point in time.

Additionally, as will be described (e.g., with respect to FIGS. 11-12), game actions (e.g., particular types of game actions, such as shots on goal that missed) might not always be automatically associated with portions of video (e.g. the game action might not be 'auto-tagged'), and a spectator may want a particular game action (e.g., a particular miss) associated with a portion of video. The spectator can record the game action (e.g., a game action of a type not automatically being associated with portions of video), as described above, and can interact with one or more user interfaces to specify that the game action is to be associated with a portion of video.

To implement the above described manual association of portions of video with recorded game actions, a user can interact with one or more user interfaces. For instance, the user can interact with user interfaces illustrated in FIGS. 7-9 and 11-12, which are examples of interactive user interfaces presented on, and generated by, or in part by, a user device (e.g., a mobile device, a tablet, a wearable device, a laptop, a computer). For instance, the user device can execute an application, such as a mobile application downloaded from an electronic 'app' store, that generates the illustrated user interface displays. In some implementations, the user interfaces can be presented on the user device as a document (e.g., a web page generated by the game monitoring system 100) in an application (e.g., a web browser), with the document received from a system (e.g., the game monitoring system 100) over a network (e.g., the Internet). In implementations in which the user interfaces are presented as a document (e.g., a web page), any interactions with the document can be provided to the system (e.g., the game monitoring system 100) for processing, and/or the document can include executable code (e.g., Javascript, Java, and so on) that can implement any, or all, functionality described above (e.g., determining coordinates of a user input on a graphical representation of a game map, and so on), and provide information indicating the functionality to the system (e.g., the game monitoring system 100 can receive indications of game actions as described above).

Each of the user interfaces described below can include user selectable options that, upon selection, can cause the user device to obtain associated information (e.g., from local storage, from an outside system such as a search engine, or from the game monitoring system 100), determine updated information, and modify, or generate, user interface data.

Figure 7:
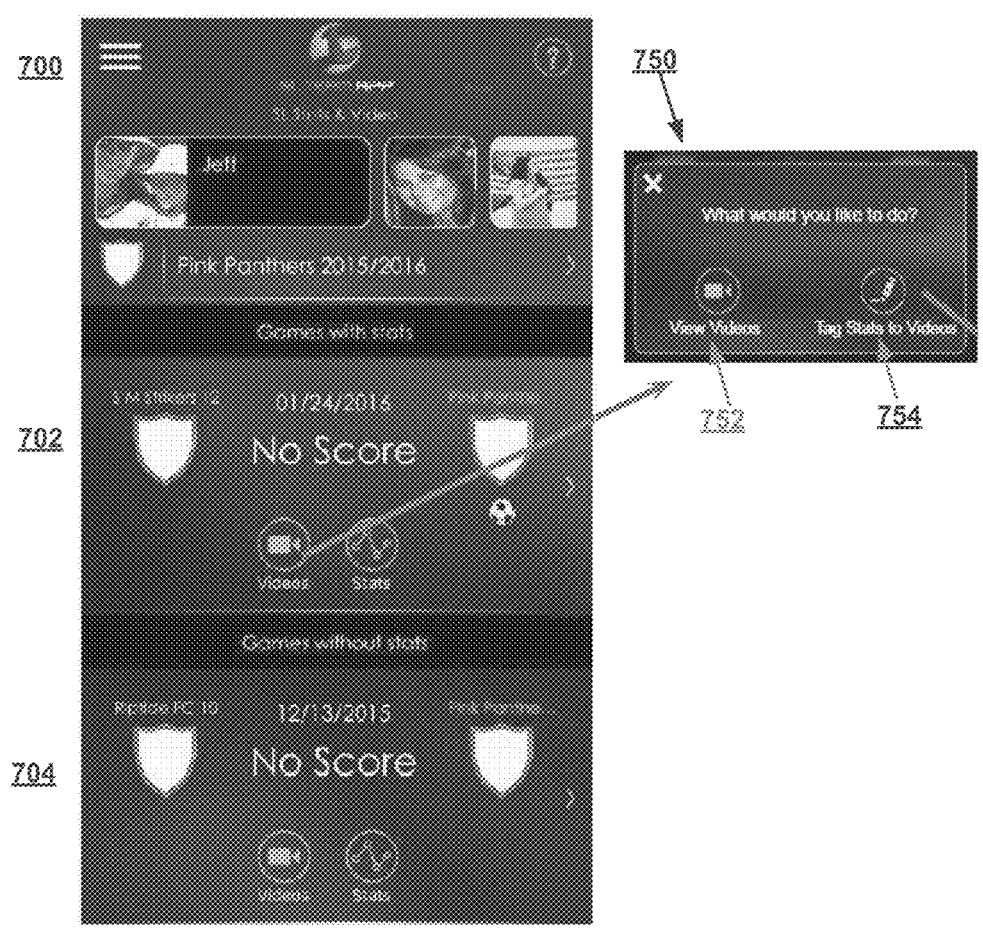
FIG. 7 is an example user interface for manually associating game actions with portions of video.

FIG. 7 is an example user interface 700 for manually associating game actions with portions of video. The user interface 700 includes user interface elements indicating sports games available for selection, including a first sports game 702 in which game actions have been indicated, and a second sports game 704 in which game actions have not been indicated. Each user interface element specifying a sports game includes an identification of the teams, scoring information, a date of the game, and so on.

As illustrated in FIG. 7, a user of the user interface 700 has selected the "Videos" user interface element associated with the first listed sports game 702. For instance, the user can touch this element on a touch-screen of a user device, or the user can utilize a mouse to select the element. Upon selection, the user interface 700 is updated to present a user interface element 750 that includes a selectable "View Videos" object 752 and a selectable "Tag Stats to Videos" object 754. In some implementations, the user interface element 750 can be presented as a window over the user interface 700. In some implementations, the user interface element 750 can be presented in focus, with the background of the user interface 700 presented out of focus (e.g., blurry) to indicate that the user interface element 750 is an active window. For particular user devices that can determine a force applied to a touch screen of the user device, the user device can determine that the user pressed with a force greater than a threshold on the user interface element associated with the first sports game 702, and the user interface element 750 can be presented to the user.

The user interface 700 in FIG. 7 also includes a selectable "Stats" object for the user to specify game actions, as described above. As an example, the user can be a coach, a team administrator, a parent, and so on, who desires to view the first sports game 702 (e.g., after completion of the first sports game 702).

As illustrated in FIG. 7, the user can select "View Videos" 752 to view one or more videos of the first sports game 702. For instance, multiple videos of the game, each from a different perspective (e.g., sideline, goal line, view from an unmanned aerial vehicle, view from a wearable device such as a GOPRO, and so on) can be available for selection, and the user can select a particular video to view. The user can also select the "Tag Stats to Videos" option 754 to associate indicated game actions with portions of video of the first sports game 702. As will be described, the user can provide (e.g., upload) a new video for storage by the game monitoring system 100, and can associate indicated game actions with portions of the new video. Additionally, the user can associate indicated game actions with portions of videos being presently stored by the game monitoring system 100.

Figure 8:
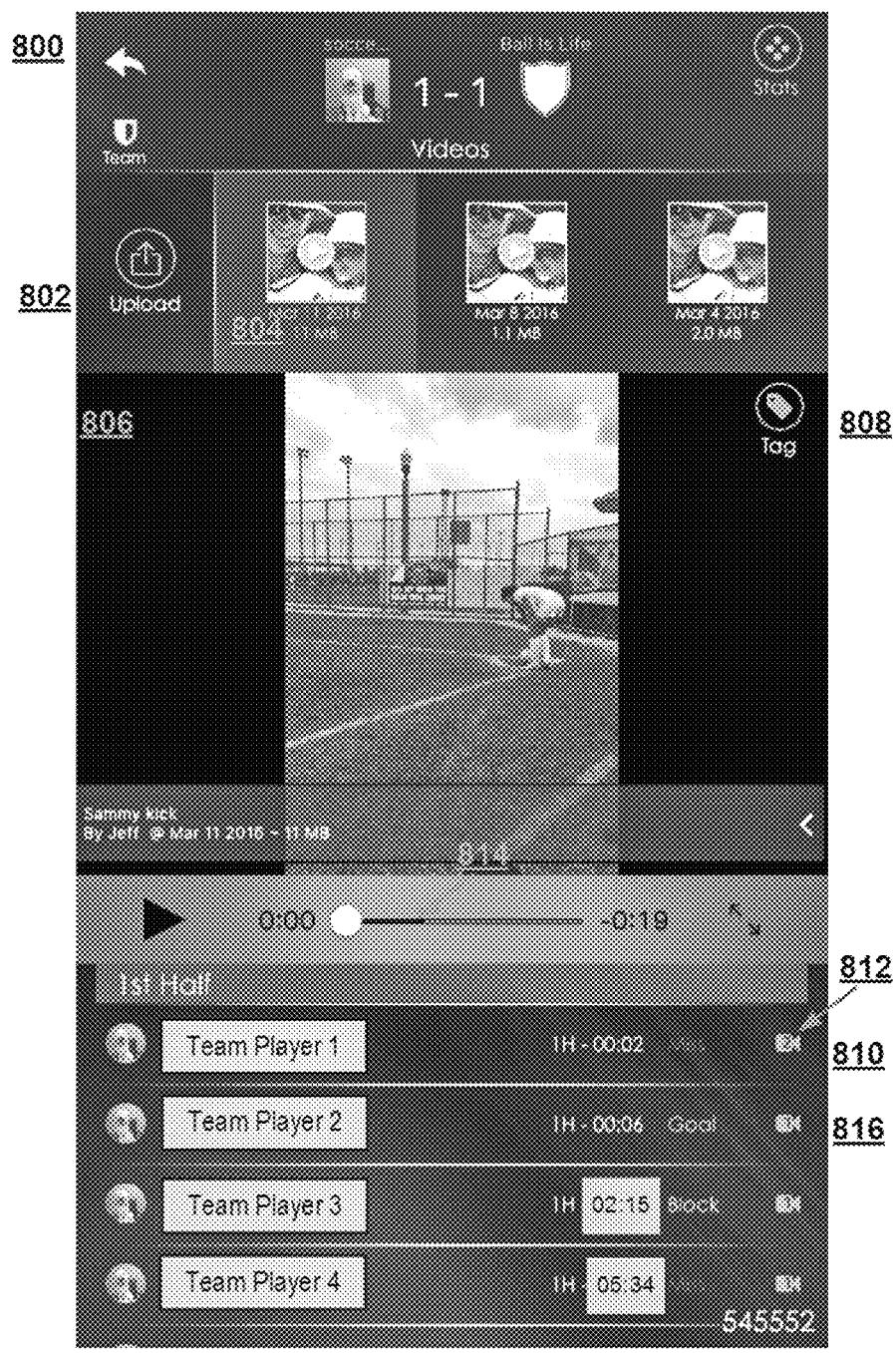
FIG. 8 is an example user interface for manually associating previously indicated game actions with portions of video of a selected sports game.
Figure 9:
FIG. 9 is an example user interface for selecting a game action to associate with a portion of video.

FIG. 8 is an example user interface 800 for manually associating previously indicated game actions with portions of video of a selected sports game (e.g., the first sports game 702 described above). The user can access this interface 800 by selecting the "Tag Stats to Video" option (FIG. 7) of the selected sports game. The user interface 800 includes videos available for the user to view, with optionally each video including textual information such as a label, a time (e.g., a date) the video was taken or uploaded, a size of the video, and so on.

The user interface 800 includes a selectable option 802 to upload a video of the selected sports game. As described above, with reference to FIGS. 1-3, the game monitoring system 100 can receive video (e.g., streaming video) captured during the selected sports game. This received video can be automatically associated with indicated game actions using, for instance, time reference data associated with the video and the indicated game actions (e.g., based on a same game clock, and so on, as described in FIG. 3). A particular spectator can record, or otherwise obtain video, of the selected sports game, and upload the video to the game monitoring system 100 for later access by the particular spectator, or by one or more other users. For instance, the particular spectator might have captured the video from a unique perspective (e.g., a body camera worn by a player such as a GOPRO, an unmanned aerial vehicle, and so on), and may want the captured video to be available for other users to view. In the example shown in FIG. 8, the user can tap on one of the three videos shown to the right of the "Upload" object to specify the video to be uploaded.

Upon selection of a video, for instance the highlighted video 804 as illustrated in FIG. 8 or an uploaded video, the user interface 800 can present (e.g., display) the selected video 806. The selected video 806 can be presented along with one or more controls (e.g., play control, pause control, rewind/fast forward, or a control to access a random location in the selected video), and the user can view the selected video 806.

Below the presentation of the selected video 806, the user interface 800 includes identifications 808 of one or more game actions (also referred to as "events") that were indicated during the selected sports game. As described above, spectators viewing sports games can utilize a mobile application (e.g., the same mobile application generating the user interface 800) to describe a game action or event, including one or more of an identification of a particular player, a type of game action performed, an outcome of the game action, a location at which the game action started, and/or a location of an outcome. In the example of FIG. 8, each identification of a game action 808 includes an identification of a player, a time at which the game action was indicated (e.g., based off a game clock), an outcome of the game action, and an indication of whether the game action has been associated with a portion of the selected video 806. For instance, a first game action 810 includes a graphical element 812 (e.g., a camera with a number included in the camera) depicting a number of portions of videos that have been associated with the first game action (e.g., 2 videos have been associated with the first game action 810 as shown in the camera). Similarly, a second game action 816 includes a graphical element (e.g., the camera described above) depicting a number of portions of videos that have been associated with the second game action 816 (e.g., 1 video). As will be described below, with respect to FIGS. 11-12, some indicated game actions might not have been associated with portions of video. For example, only particular types of game actions might be automatically associated with portions of video, the user can determine that a particular game action has had 0 videos associated with it, and can manually associate the particular game action with one or more portions of video.

While viewing the selected video 806, the user can associate a portion of the video with one of the previously indicated game actions or events. In the example FIG. 8, while watching the selected video 806, if the user selects the "Tag" option 808, the user is presented with the "Select a stat to tag" option box shown in FIG. 9 (e.g., FIG. 9 can be presented over user interface 800, such that user interface 800 is out of focus or otherwise de-identified). From this box, the user can select one of the listed (pre-recorded) game actions, in which case the game monitoring system 100 will associate a currently-viewed portion of the selected video 806 with that game action. Similarly, while watching the selected video 806, if the user pauses the selected video 806, and then selects the "Tag" option 808, or optionally without selecting the option 808, the user is presented with the "Select a stat to tag" option box shown in FIG. 9. The user can then select a particular listed game action, and as will be described below, the user device can determine a portion of the selected video based on a location in the selected video 806 at which the selected video 806 was paused.

In some implementations, the game monitoring system 100, or user device (application), can designate the portion of the selected video 806 as beginning a first threshold amount of time prior to a location in the selected video 806 at which the user selected the indicator, such as the tag option 808), (e.g., 5 seconds, 3 seconds, 0 seconds, an amount of time depending on a type of game action), and ending a second threshold amount of time subsequent to the location (3 seconds, 5 seconds, 10 seconds, an amount of time depending on a type of game action). In some implementations, the user interface 800 can update to request that the user select a location in the selected video 806 that the portion should begin from, and then request that the user select a location in the selected video at which the portion should end. As an example, the user can then rewind the selected video (e.g., using a rewind control, or by accessing a random access location option 814 and selecting a point prior to a present location), and then view the video until a location at which the portion should end, or optionally fast forward (e.g., using a fast forward control, or by accessing the random access location option 814). Similarly, after receiving an indication of a location in the selected video 806 at which the portion is to begin, the selected video 806 can begin playing from the indicated location until receiving user interaction specifying that the portion is to end. In some implementations, the user can pause the selected video 806, and select a game action 810 (e.g., press the indication of the first game action 810), and the portion will be designated as being from a first threshold prior to the pausing to a second threshold subsequent to the pausing (e.g., as described above with respect to the tag option 808). Similarly, in some implementations, the user can pause the selected video 806, and interact with the tagging user interface element 808 to specify a particular game action shown in the video (e.g., the first game action 810), and the portion can be designated.

In implementations in which the user device determines the portion of video (or does so by default if the user does not opt to manually specify the start and end points), the game monitoring system 100 can receive information describing the portion of the selected video 806, and associate the information with the first game action 810. For example, the game monitoring system 100 can store the boundaries of the portion, such as respective time stamps, video frame numbers or identifiers, and so on, of a start and end, or the game monitoring system 100 can store data associated with the portion (e.g., the actual video file associated with the portion). In implementations in which the game monitoring system 100 determines the portion of the selected video 806, for instance receiving information identifying a location at which the user paused the selected video and determining the start and end information from the received location information, the game monitoring system 100 can store information describing the portion.

In this way, the user can watch the selected video 806 and associate portions of the selected video 806 with particular game actions/events previously logged, for example by spectators. While the selected video 806 is being presented in the user interface 800, and progresses in time, an order in which the indicated game actions are presented can be modified in some implementations. For instance, as illustrated in FIG. 8, a top presented game action is associated with "Team Player 1" and occurred at "00:002", a next presented game action is associated with "Team Player 2" and occurred at "00:06", and a next presented game action is associated with "Team Player 3" and occurred at "02:15". In these implementations, as the selected video 806 approaches a game time closer to 02:15, the third presented "Team Player 3" game action can be moved to the top presented game action position. In this way, the user can quickly access the game action that is most likely to be occurring in the selected video near the playing time.

Furthermore, since the game monitoring system 100 can maintain multiple videos of the selected sports game, after the user associates the first game action 810 with a portion of video, the user interface 800 can update to specify other videos of the selected sports game that have not been associated with the first game action 810. The user can then select each video and associate a portion with the first game action 810. In some implementations, the user interface 800 can start each selected other video from a location corresponding to the location the user associated the first game action 810 with the video 806. For instance, if the user paused the selected video 806 at 12 minutes into the video and associated a portion with the first game action 810, the user interface 800 can begin presentation of other videos at 12 minutes in. This can be effective in situations in which each video is associated with the same time reference data, for instance each video was, or is presently being, live-streamed to the game monitoring system 100 and was, or is, associated with a same game clock (e.g., as described above). Optionally, the user interface 800 can provide information to the user specifying remaining videos that can be associated with the first game action 810, and can optionally being presentation of each remaining video (e.g., upon manual association of a prior video). Furthermore, if each video is associated with the same time reference data, in some implementations the game monitoring system 100 can automatically associate the first game action 810 with each other video once the user associates the first game action 810 with the selected video 806. That is, since each video includes the same time reference data, correlating each video can be accurate (e.g., utilizing the same time-stamps since they are based on the same game clock).

In situations where the video was recorded without a game clock (e.g., recorded on a movie camera), the time reference data might be different. Therefore, if the user associates the first game action 810 with a portion of a selected video 806, the other videos showing the selected game 806 might show the first game action 810 in different locations (e.g., one video might have started 10 minutes into the selected sports game, and so on). In some implementations for these situations, the user can associate one or more game actions with portions of each video, and the game monitoring system 100 can store information describing correlations between each video. For example, if the portion of the selected video 806 begins 12 minutes into the selected video 806 and ends 12:15 in to the selected video 806, and if for another video the portion showing the same game action begins 14 minutes into the other video and ends 14:15 minutes into the other video, the game monitoring system 100 can store a time offset from the videos (e.g., 2 minutes). In this way, the game monitoring system 100 can learn the time differences between each video, and automatically update other videos once the user associates a game action with one video. In some implementations, the system 100 can specify that time differences are learned upon a threshold number of portions of video being correlated (e.g., 4 portions of video were indicated for each video). Optionally, for the automatic updating process, the user interface 800 can present the automatically determined portion of each video, and the user can modify the portion or confirm that it is correct (e.g., modify the portion as described above in FIG. 4). In some implementations, each video can be processed according to one or more computer vision processes to correlate features across videos, such that the videos can be referenced, and particular actions can be identified in each video (e.g., particular player movements, movement of balls, trees, crowds, crowd noise, and so on). In this way, the videos can be automatically correlated together.

Figure 10:
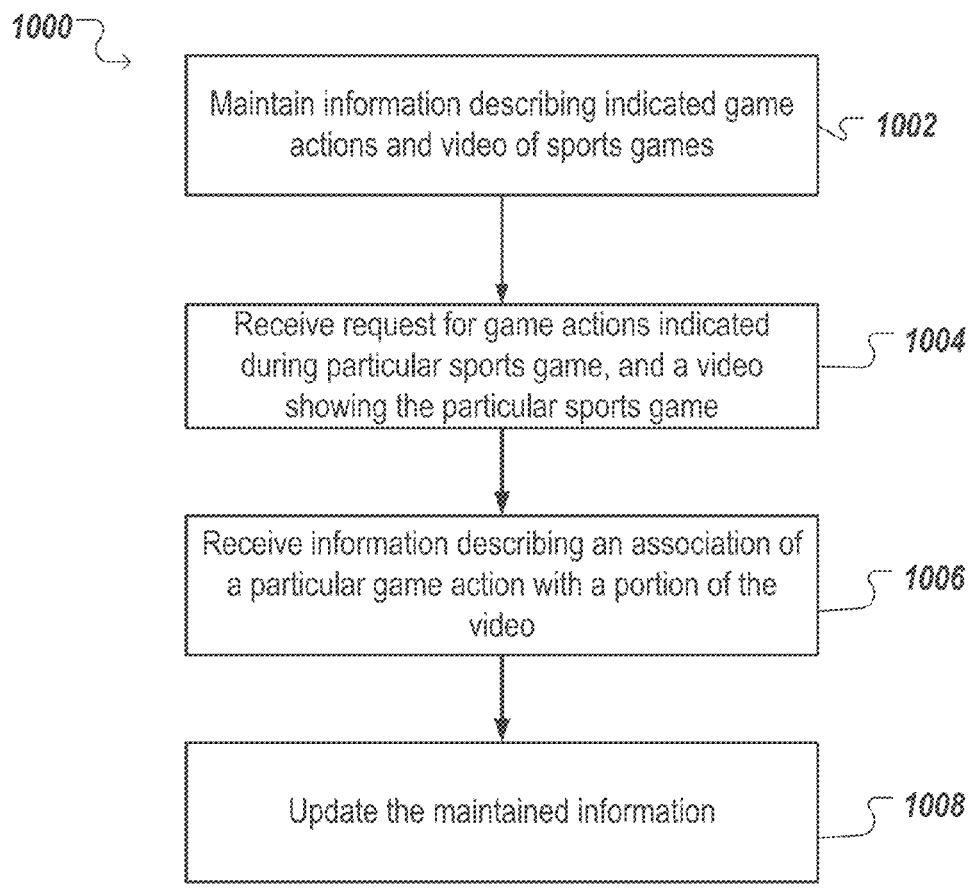
FIG. 10 is a flowchart of an example process for generating manual associations of portions of video with indicated game actions.

FIG. 10 is a flowchart of an example process 1000 for generating manual associations of portions of video with indicated game actions. For convenience, the process 1000 will be described as being performed by a system of one or more computers (e.g., the game monitoring system 100).

The system maintains information describing indicated game actions and video of sports games (block 1002). As described above (e.g., in FIGS. 1-3), the system can receive indications of game actions by users (e.g., spectators) viewing sports games. The system can store information describing each game action, including a name of a player that performed the game action, a type of game action (e.g., a shot, a kick, a block, a tackle), an outcome of the game action (e.g., a goal), a location from which the game action started, and a location at which an outcome occurred. The system can associate the game actions with sports games in which the game actions occurred. Similarly, the system can receive video (e.g., live-streaming video, recorded video, and so on) of the sports games, and store the video for presentation one or more user devices (e.g., user devices executing an application that is in communication with the system).

The system receives a request for game actions indicated during a particular sports game and a video showing the particular sports game (block 1004). As described above, in FIG. 8, a user of a user device can be presented with sports games, and can select a particular sports game. The system can access the maintained information, and obtain, for presentation on the user device, information describing indicated game actions during the particular sports game. Similarly, the user can select a particular video of the sports game to view, and the system can provide (e.g., stream) the particular video for presentation on the user device. Alternatively, the system can receive a new video for storage from the user device.

The system receives information describing a manual association of a particular game action with a portion of the video (block 1006). As described above, in FIG. 8, while viewing the video, the user can indicate that the particular game action is shown in the video. The system receives information describing the portion (e.g., timestamps of the portion, identifications of frames in the video), and the system stores the information or the portion itself. Alternatively, as described above, the system can determine the portion of video, and correlate among multiple videos of the particular sports game to determine respective portions of each video that show the particular game action. Optionally, the system can present each portion of video for presentation to the user, and the user can indicate whether the portion shows the particular game action, or is to be modified (e.g., as described above in FIG. 4).

The system updates the maintained information (block 1008). After receiving the information describing the manual association, the system updates the maintained information to associate the portion of video with the particular game action. In this way, the user, or a different user, can view the manually associated portion of video.

Auto-Tagging

FIGS. 1-6 described automatically associating game actions with portions of video that show the game actions. Optionally, the automatic association can be constrained to automatic association of particular types of game actions, such as one or more of goals, blocks, misses, foul-balls, three-point shots, field goals, and so on (e.g., as described above).

For instance, a spectator, team administrator, team coach, parent, and so on, can designate that a particular type of game action is to always be associated with portions of video, while other types of game actions are not to be associated (e.g., without user interaction). In this way, only game actions (e.g., goals) of interest to the user, team, will be associated, while other types of game actions (e.g., misses, blocks) will be associated with portions of video only upon user action. For instance, subsequent to a sports game, a user can watch a video of the sports game and manually associate game actions that were not automatically associated with portions of video, to portions of video (e.g., manual tagging as described above in FIGS. 7-10).

Additionally, while a sports game is playing, a spectator can still record (e.g., indicate) types of game actions that are not automatically being associated with portions of video, and the user can manually indicate (e.g., while recording information describing the game actions) that the game actions are to be associated (e.g., automatically associated as described in FIGS. 1-6) with portions of video. For instance, a spectator can indicate that a particularly interesting block should be associated with a portion of video, and while recording the interesting block, can utilize one or more user interfaces (e.g., FIG. 12) to cause the association.

Figure 11:
FIG. 11 illustrates an example user interface for indicating an auto-tagged type of game action.

FIG. 11 illustrates an example user interface 1100 for indicating an auto-tagged type of game action. The user interface 1000 includes three types of game actions for presentation to a user, a goal, a miss, and a block. Below each type of game action is a selectable option to designate the associated game action as always being associated with portions of video. For instance, the user has selected that "Goals" are to automatically be associated with portions of video that show the Goal. In this way, spectators viewing the game can be presented with a reduced set of options to indicate a game action. For example, the spectators can merely be presented with a list of players, and can designate the player along with a starting location of where the goal game action began, and optionally an ending location. If there are two or more types of game actions that are to be automatically associated with portions of video, the spectators can select from among the two types, and indicate an associated game action. Optionally, to indicate other types of game actions, the spectators can select a particular user interface element to manually associate other types of game actions, and be presented with a list of types of game actions for selection.

Figure 12:
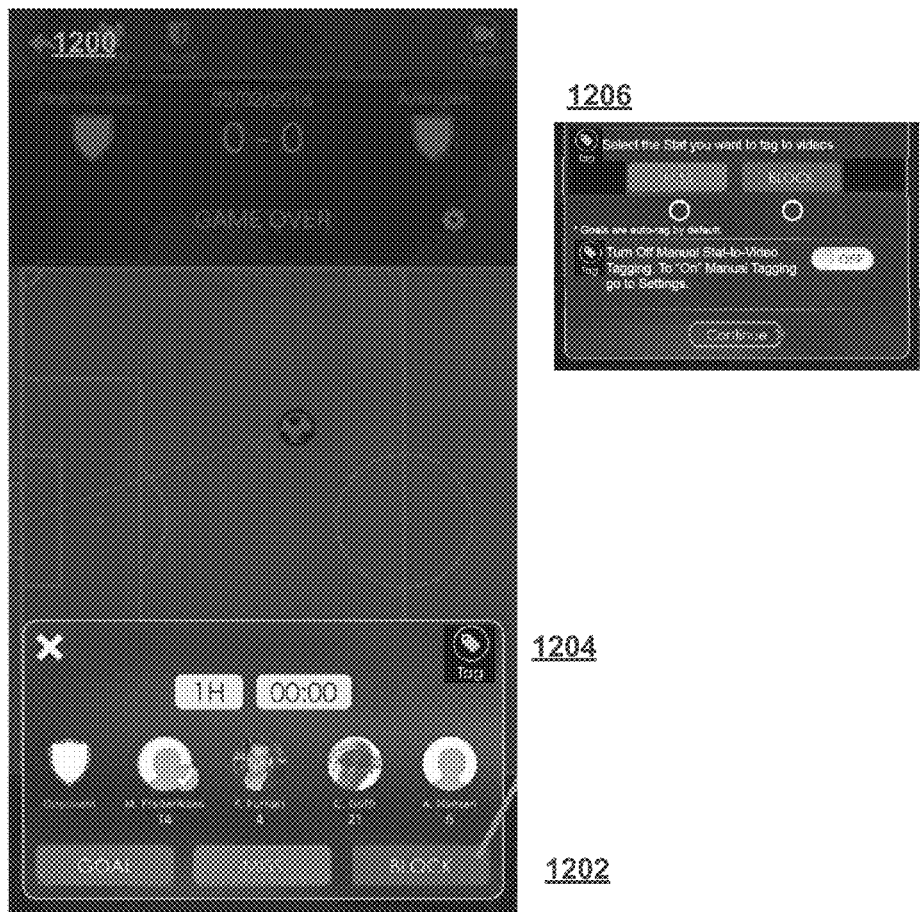
FIG. 12 illustrates an example user interface for recording a type of game action that has not been indicated as automatically being associated with portions of video.

FIG. 12 illustrates an example user interface 1200 for recording a type of game action that has not been indicated as automatically being associated with portions of video. As described above, users can designate particular types of game actions as being automatically associated with portions of video. In the example of FIG. 12, the user is presented with a game map (e.g., as described above with respect to FIG. 1) representing a soccer field. The user has indicated that he/she is going to record (e.g., indicate) a game action, and has selected a particular player (e.g., M. Frederiksen, which can identified to the user with a checkmark, as shown, or can otherwise be highlighted), and has selected a type of game action that is not being automatically associated with portions of video (e.g., not being auto-tagged), which in the example of FIG. 12 is a game action associated with a "Block". In some implementations, to associate the game action with a portion of video, the user can select a tagging user interface element 1204 and the game action can be associated with a portion of video (e.g., automatically associated as described above with respect to FIGS. 1-6). In some implementations, upon selection of the user interface element 1204, or upon selection of the type of game action (e.g., "Block"), user interface 1206 can presented. Using the user interface 1206, the user can confirm the type of game action to be associated with a portion of video. For instance, the user can select the "Block" option presented in user interface 1206, and can further disable an option to manually associate game actions to portions of video.

Each of the processes, methods, and algorithms described in the preceding sections may be embodied in, and fully or partially automated by, code modules executed by one or more computer systems or computer processors comprising computer hardware. The code modules (or "engines") may be stored on any type of one or more non-transitory computer-readable media or computer storage devices, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the game monitoring system 100 or the user device 120, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into submodules despite their physical organization or storage. Electronic Data Sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A multi-user system for collaboratively capturing and indexing videos of sporting events, comprising:
    a mobile application that runs on mobile devices of users, the mobile application including a touch-based user interface that includes functionality for spectators to specify game action data specifying game events associated with players that occur during a sports event, the user interface enabling a spectator to specify, for a game event, game action data specifying at least a type of game action performed by a player, a selection of the player involved, and an outcome of the game action performed by the player, the mobile application additionally providing functionality for spectators to record videos of the sports event, whereby multiple spectators can collaboratively capture video data and non-video game action data representing the sports event; and
    a user database that stores user account information of users of the mobile application, the user account information specifying respective permissions of the users to provide game action data for sports events;
    a server system that communicates over a network with instances of the mobile application running on the mobile devices of the users, the server system configured to receive the video data and the non-video game action data from the mobile devices during the sports event, and to store the received video data and non-video game action data in association with the sports event, the server system additionally configured to provide remote, networked based user access to the stored video data and non-video game action data, wherein the server system enforces the permissions of the users to provide game action data;
    wherein the mobile application includes an association creation interface that includes functionality for a user to view a previously recorded video of the sports event and, during said viewing of the previously recorded video, interactively create an association between (1) a segment of the previously recorded video of the sports event, the segment composed of less than all of the previously recorded video, and (2) non-video game action data descriptive of a game event associated with a player represented in the segment that occurred during the sports event, wherein for the segment of the previously recorded video, the association creation interface is configured to display a plurality of touch-selectable controls that enable the user to select at least a player corresponding to the game event, wherein the mobile application is configured to cause the association to be communicated to the server system.

2. The multi-user system of claim 1, wherein the server system uses associations created with the association creation interface to generate an index that enables users to jump to video segments corresponding to selected game events.

3. The multi-user system of claim 1, wherein the association creation interface enables the user to specify, within the previously recorded video, a start of the segment and an end of the segment.

4. The multi-user system of claim 1, wherein the association creation interface enables the user to create an association between a particular game event and multiple video segments that correspond to the game event, each of the multiple video segments generated by a different mobile device.

5. The multi-user system of claim 1, wherein the multi-user system is responsive to a user creating an association between a first specified game event and a segment of a first recorded video by automatically creating an association between the first specified game event and a segment of a second recorded video.

6. The multi-user system of claim 1, wherein the multi-user system is additionally configured to use time references in the game action data and in the video data to automatically create associations between game events and corresponding video segments.

7. The multi-user system of claim 1, wherein the association creation interface is configured to (1) display, during viewing of the previously recorded video, a listing of a plurality of previously recorded game events that are associated with the previously recorded video but which are not yet associated with any specific segments of the previously recorded video, (2) based on a user selection from said listing, associate a previously recorded game event with a particular segment of the previously recorded video.

8. The multi-user system of claim 1, wherein the multi-user system is configurable to (1) automatically create associations between specified game actions of a first type and corresponding video segments, and (2) refrain from automatically creating associations between specified game actions of a second type and corresponding video segments.

9. The multi-user system of claim 1, wherein at least some of the users have different permissions than other users to provide game action data.

10. A multi-user system capable of capturing and integrating video and non-video data for sports events, the system comprising:

a server system configured to store, in association with a sports event, one or more videos generated by one or more spectators of the sports event;

a mobile application that includes a touch-based user interface that includes functionality for a user to record game action data specifying game events associated with players that occur during the sports event, the user interface enabling the user to record, for a game event, game action data specifying at least a type of game action performed by a player, a selection of the player involved, and an outcome of the game action performed by the player, the mobile application configured to transmit the game action data over a network to the server system; and a user database that stores user account information of users of the mobile application, the user account information specifying respective permissions of the users to record game action data for sports events;

wherein the server system is configured to enforce said permissions for recording game action data, and is configured to store association data specifying associations between (1) particular game events for which game action data has been recorded with the mobile application, and (2) corresponding segments of the one or more videos of the sports event depicting associated game events, the server system additionally configured to use the association data to provide index-based user access to the segments;

wherein the mobile application includes an association creation interface that provides functionality, including a touch-based user interface, for a user to view a previously recorded video stored on the server system and, during said viewing of the previously recorded video, specify an association between a segment of the previously recorded video and a game event shown in the segment, said association including indications of a player involved in the game event, a game action performed by the player, and an outcome of the performed game action, the mobile application configured to report the association to the server system, said segment containing less than all of the previously recorded video.

11. The multi-user system of 10, wherein the association creation user interface includes functionality for the user to specify the start and end points of the segment within the previously recorded video.

12. The multi-user system of 10, wherein the user account information for a first user associates the first user with a particular team, and specifies that the first user can record game action data only for the particular team.

13. The multi-user system of 10, wherein the association creation interface displays a listing of game events recorded in association with the sports event, and enables the user to select a game event from the listing to associate with the segment of the previously recorded video of the sports event.

14. The multi-user system of 10, wherein the associations include automatically-generated associations created by the multi-user system by matching time reference data in the game action data to corresponding time references in the one or more recorded videos.

15. The multi-user system of 14, wherein the time references are game clock references.

16. The multi-user system of 10, wherein the server system is configured to use a time reference associated with a recorded game event, and time reference data included in a recorded video, to automatically create an association between the recorded game event and a corresponding segment of the recorded video.

17. The multi-user system of 10, wherein the mobile application provides a video recording option which enables a user to record, and stream to the server system, a video of the sports event.

18. The multi-user system of 10, further comprising a configuration user interface that enables a user to specify, for each of a plurality of game action types, whether game events of the respective game type are to be automatically associated with corresponding segments of recorded videos.

19. The multi-user system of claim 10, wherein at least some of the users have different permissions than other users to record game action data.

* * * * *

UNITED STATES PATENT AND TRADEMARK OFFICE
CERTIFICATE OF CORRECTION

PATENT NO. : 9,861,899 B1  
APPLICATION NO. : 15/232625  
DATED : January 9, 2018  
INVENTOR(S) : Jeffrey Lowell Lawson et al.

It is certified that error appears in the above-identified patent and that said Letters Patent is hereby corrected as shown below:

In the Claims

Column 34 Line 1, Claim 11 after "system of" insert --claim--.

Column 34 Line 6, Claim 12 after "system of" insert --claim--.

Column 34 Line 10, Claim 13 after "system of" insert --claim--.

Column 34 Line 15, Claim 14 after "system of" insert --claim--.

Column 34 Line 20, Claim 15 after "system of" insert --claim--.

Column 34 Line 23, Claim 16 after "system of" insert --claim--.

Column 34 Line 29, Claim 17 after "system of" insert --claim--.

Column 34 Line 33, Claim 18 after "system of" insert --claim--.

Signed and Sealed this
Eighth Day of May, 2018

Andrei Iancu
*Director of the United States Patent and Trademark Office*